United States Patent
Watanabe et al.

(10) Patent No.: US 8,841,025 B2
(45) Date of Patent: Sep. 23, 2014

(54) POSITIVE ELECTRODE WITH HETEROPOLY AND PHOSPHOROUS ADDITIVES AND NONAQUEOUS ELECTROLYTE BATTERY

(75) Inventors: Haruo Watanabe, Kanagawa (JP);
Tomoyo Ooyama, Fukushima (JP);
Shunsuke Saito, Fukushima (JP);
Yosuke Hosoya, Fukushima (JP);
Shigeru Fujita, Fukushima (JP)

(73) Assignee: Sony Corporation, Tokyo (JP)

( * ) Notice: Subject to any disclaimer, the term of this patent is extended or adjusted under 35 U.S.C. 154(b) by 549 days.

(21) Appl. No.: 12/939,811

(22) Filed: Nov. 4, 2010

(65) Prior Publication Data

US 2011/0104557 A1 May 5, 2011

(30) Foreign Application Priority Data

Nov. 5, 2009 (JP) ................................ P2009-253931

(51) Int. Cl.
*H01M 4/13* (2010.01)
*H01M 4/505* (2010.01)
*H01M 4/131* (2010.01)
*H01M 4/525* (2010.01)
*H01M 4/62* (2006.01)
*H01M 10/052* (2010.01)
*H01M 4/58* (2010.01)

(52) U.S. Cl.
CPC ............ *H01M 4/505* (2013.01); *H01M 4/5825* (2013.01); *H01M 4/131* (2013.01); *H01M 4/525* (2013.01); *H01M 4/62* (2013.01); *H01M 10/052* (2013.01); *Y02E 60/122* (2013.01)
USPC ...................... 429/218.1; 429/209; 429/231.5

(58) Field of Classification Search
CPC .... H01M 4/131; H01M 4/628; H01M 4/5825
USPC .................................... 429/209, 218.1, 231.5
See application file for complete search history.

(56) References Cited

U.S. PATENT DOCUMENTS

| | | | |
|---|---|---|---|
| 4,630,176 A | 12/1986 | Cuellar et al. | |
| 4,633,372 A | 12/1986 | Calahan et al. | |
| 5,487,960 A * | 1/1996 | Tanaka | ........................ 429/332 |
| 5,501,922 A | 3/1996 | Li et al. | |
| 2008/0254368 A1* | 10/2008 | Ooyama et al. | ................ 429/223 |

FOREIGN PATENT DOCUMENTS

| | | | | |
|---|---|---|---|---|
| JP | 59-060818 | 4/1984 | | |
| JP | 3192855 | 5/2001 | | |
| JP | 2002-507310 | 3/2002 | | |
| JP | 2002-289188 | 10/2002 | | |
| JP | 2002289188 A | * 10/2002 | ............. | H01M 4/58 |
| JP | 2004-214116 | 7/2004 | | |
| JP | 2005-123156 | 5/2005 | | |
| JP | 2007-511873 | 5/2007 | | |
| JP | 2009-107990 | 5/2009 | | |

OTHER PUBLICATIONS

Machine translation of JP 2002-289188 A.*

* cited by examiner

*Primary Examiner* — Zachary Best
(74) *Attorney, Agent, or Firm* — K&L Gates LLP

(57) ABSTRACT

A positive electrode for a nonaqueous electrolyte battery includes a collector, and a positive electrode active material layer. The positive electrode active material layer includes a positive electrode active material, and also includes a heteropoly acid and/or heteropoly acid compound and phosphorous acid as additives.

9 Claims, 4 Drawing Sheets

POSITIVE ELECTRODE WITH HETEROPOLY AND PHOSPHOROUS ADDITIVES AND NONAQUEOUS ELECTROLYTE BATTERY

CROSS REFERENCES TO RELATED APPLICATIONS

The present application claims priority to Japanese Patent Application JP 2009-253931 filed on Nov. 5, 2009, the entire contents of which is hereby incorporated by reference.

BACKGROUND

The present disclosure relates to a positive electrode and a nonaqueous electrolyte battery, and particularly relates to a positive electrode and a nonaqueous electrolyte battery, which are capable of suppressing gas generation and the battery swelling that accompanies it.

In recent years, with the spread of portable devices such as video cameras and laptop personal computers, there is an increasing need for small-size, high-capacity secondary batteries. As secondary batteries, nickel-cadmium batteries and nickel-hydrogen batteries using an alkali electrolytic solution are currently used. However, their battery voltages are as low as about 1.2 V, and it is difficult to improve energy density. For this reason, studies have been made on lithium metal secondary batteries using lithium metal. Lithium metal has a specific gravity of 0.534, the lowest among solid elementary substances, and also has an extremely low potential. Further, its current capacity per unit weight is the highest among metal negative electrode materials.

However, in a secondary battery using lithium metal for the negative electrode, dendritic lithium (dendrite) deposits on the surface of the negative electrode at the time of charging, and it grows through charge/discharge cycles. The growth of dendrites not only degrades the charge/discharge cycle characteristics of the secondary battery. In the worst case, they break through the barrier (separator) disposed to prevent contact between the positive electrode and the negative electrode. As a result, an internal short circuit occurs, causing thermal runaway, whereby the battery is broken.

Therefore, as described in JP-A-62-90863, for example, a secondary battery using coke or a like carbonaceous material for the negative electrode, in which charging and discharging are repeated by doping with alkali metal ions and de-doping, has been proposed. This has been proven to solve the problem of degradation of the negative electrode during repeated charging and discharging mentioned above.

Meanwhile, as a result of the search for and development of high-potential active materials for use as positive electrode active materials, materials with a battery voltage of about 4 V have emerged and are attracting attention. Known examples of such active materials are inorganic compounds, such as alkali-metal-containing transition metal oxides and transition metal chalcogens.

Among these, a lithium transition metal composite oxide containing nickel or cobalt as a main component, such as $Li_xNiO_2$ ($0<x\leq1.0$) or $Li_xCoO_2$ ($0<x\leq1.0$), holds the greatest promise for high potential, stability, and long life. In particular, a lithium transition metal composite oxide containing nickel as a main component is a positive electrode active material having relatively high potential. The use of such a positive electrode active material for a battery is expected to achieve high charging current capacity and improve energy density.

SUMMARY

However, a secondary battery using a lithium transition metal composite oxide as the positive electrode active material has a problem that gas is often generated inside the battery, causing an increase in the internal pressure of the battery. In particular, with respect to batteries housed in a laminate film, there is a problem that such a battery has a greater tendency to swell due to gas generation. Such problems are especially likely to occur in a secondary battery in which a lithium transition metal composite oxide containing nickel as a main component is used as the positive electrode active material.

Therefore, it is desirable to provide a positive electrode and a nonaqueous electrolyte battery, which are capable of suppressing gas generation.

According to an embodiment, there is provided a positive electrode including: a positive electrode active material containing a lithium composite oxide; a heteropoly acid and/or heteropoly acid compound; and phosphorous acid.

According to another embodiment, there is provided a nonaqueous electrolyte battery including: a positive electrode including a lithium-composite-oxide-containing positive electrode active material, a heteropoly acid and/or heteropoly acid compound, and phosphorous acid; a negative electrode; and a nonaqueous electrolyte.

In the embodiments, the heteropoly acid may be at least one kind selected from the group consisting of phosphomolybdic acid, phosphotungstic acid, silicomolybdic acid, and silicotungstic acid, for example. The heteropoly acid compound may be a compound of these heteropoly acids, for example. It is preferable that the amount of the heteropoly acid and/or heteropoly acid compound added and the amount of the phosphorous acid added with the heteropoly acid and/or heteropoly acid compound are each 0.01 wt % or more and 5.0 wt % or less based on 100 wt % of the positive electrode active material.

In the embodiments, a heteropoly acid and/or heteropoly acid compound is contained in the positive electrode together with the positive electrode active material. As a result, the oxidative nature of the positive electrode during charging can be suppressed. Further, phosphorous acid is added to the positive electrode together with the heteropoly acid and/or heteropoly acid compound. As a result, the oxidative nature of the positive electrode can be suppressed synergistically with the effects of the heteropoly acid and/or heteropoly acid compound.

According to the embodiments, gas generation due to the degradation of a nonaqueous electrolytic solution component or the like can be suppressed. Therefore, in a flat battery housed in a laminate film or the like or in a prismatic battery, battery swelling can be suppressed.

In particular, according to the embodiments, the positive electrode has the phosphorous acid together with the heteropoly acid and/or heteropoly acid compound. As a result, battery swelling can be suppressed synergistically with the heteropoly acid.

Additional features and advantages are described herein, and will be apparent from the following Detailed Description and the figures.

DETAILED DESCRIPTION

Embodiments will be described hereinafter with reference to the drawings. The description will be given in the following order.

1. First Embodiment (First example of a nonaqueous electrolyte battery)
2. Second Embodiment (Second example of a nonaqueous electrolyte battery)
3. Third Embodiment (Third example of a nonaqueous electrolyte battery)
4. Fourth Embodiment (Fourth example of a nonaqueous electrolyte battery)
5. Other Embodiments (Variations)

1. First Embodiment

Figure 1:
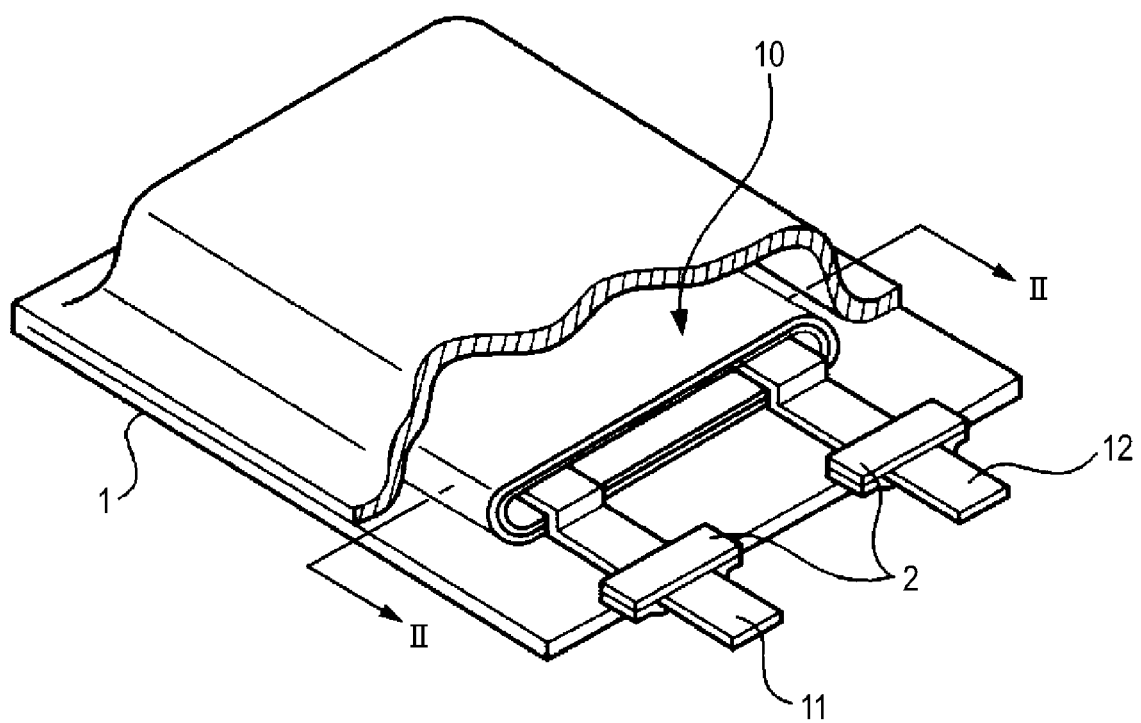
FIG. 1 is perspective view showing an example of the configuration of a nonaqueous electrolyte battery according to an embodiment.

First Example of a Nonaqueous Electrolyte Battery 1-1. Configuration of Nonaqueous Electrolyte Battery FIG. 1 is a perspective view showing an example of the configuration of a nonaqueous electrolyte battery according to a first embodiment. The nonaqueous electrolyte battery is a nonaqueous electrolyte secondary battery, for example. The nonaqueous electrolyte battery is configured such that a wound electrode assembly 10 having attached thereto a positive electrode lead 11 and a negative electrode lead 12 is housed in a film-like outer packaging member 1. The nonaqueous electrolyte battery has a flat shape.

The positive electrode lead 11 and the negative electrode lead 12 each have an oblong shape, for example. They extend in the same direction, for example, from the inside of the outer packaging member 1 to the outside. The positive electrode lead 11 is made of a metal material, such as aluminum (Al), for example. The negative electrode lead 12 is made of a metal material, such as nickel (Ni), for example.

The outer packaging member 1 is a laminate film, for example, including an insulating layer, a metal layer, and an outermost layer that are stacked in this order and bonded together by lamination, etc. With the insulating layer on the inside, the marginal portions of the outer packaging member 1 are in close contact with each other by welding or with an adhesive, for example.

The insulating layer is made of a polyolefin resin, such as polyethylene, polypropylene, modified polyethylene, modified polypropylene, or a copolymer thereof, for example, because this can achieve low moisture permeability and excellent airtightness. The metal layer is made of foil-like or plate-like aluminum, stainless steel, nickel, iron, or the like. The outermost layer may be made of the same resin as the insulating layer or may also be made of nylon or the like, for example, because this can improve strength against breaking, piercing, etc. The outer packaging member 1 may include other layers in addition to the insulating layer, the metal layer, and the outermost layer.

An adhesion film 2 is inserted between the outer packaging member 1 and the positive electrode lead 11 and also between the outer packaging member 1 and the negative electrode lead 12. The adhesion film 2 serves to improve the adhesion of the positive electrode lead 11 and the negative electrode lead 12 to the inside of the outer packaging member 1 and also to prevent the entry of outdoor air. The adhesion film 2 is made of a material that is adhesive to the positive electrode lead 11 and the negative electrode lead 12. When the positive electrode lead 11 and the negative electrode lead 12 are made of the metal materials mentioned above, the adhesion film 2 is preferably made of a polyolefin resin, such as polyethylene, polypropylene, modified polyethylene, or modified polypropylene, for example.

Figure 2:
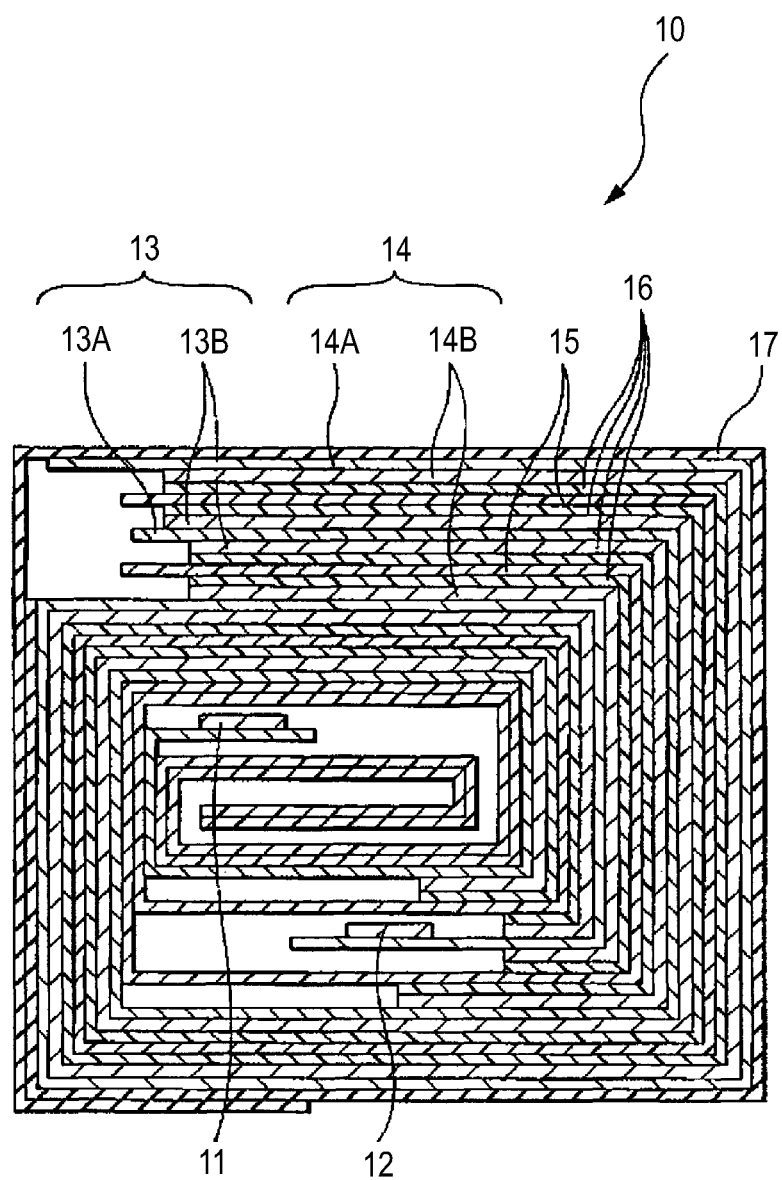
FIG. 2 is a cross-sectional view of a wound electrode assembly 10 along II-II shown in FIG. 1.

FIG. 2 is a cross-sectional view of the wound electrode assembly 10 along II-II shown in FIG. 1. The wound electrode assembly 10 is formed by laminating a positive electrode 13 and a negative electrode 14 via a separator 15 and an electrolyte 16, and winding the resulting laminate. The outermost periphery thereof is protected by a protection tape 17.

[Positive Electrode]

The positive electrode 13 includes a positive electrode collector 13A and a positive electrode active material layer 13B disposed on each side of the positive electrode collector 13A, for example. The positive electrode collector 13A may be made of a metallic foil, such as aluminum foil, for example.

The positive electrode active material layer 13B contains a positive electrode active material, a heteropoly acid and/or heteropoly acid compound, and phosphorous acid ($H_3PO_3$). Further, the positive electrode active material layer 13B also contains an electrically conductive aid, such as a carbon material, and a binder, such as polyvinylidene fluoride or polytetrafluoroethylene.

Research on the heteropoly acids and/or heteropoly acid compounds and phosphorous acid for use in the embodiments, has determined that they are each effective in suppressing gas generation inside a nonaqueous electrolyte battery and the battery swelling that accompanies it. Such heteropoly acids and/or heteropoly acid compounds and phosphorous acid are each effective in suppressing the oxidative activity of the positive electrode at the time of charging.

It has been determined that the combined use of a heteropoly acid and/or heteropoly acid compound and phosphorous acid is significantly effective in suppressing battery swelling as compared with the case where they are used alone. That is, they found that the battery-swelling-suppressing effects relative to the total amount of the heteropoly acid and/or heteropoly acid compound and the phosphorous acid are significant, and also that this causes a smaller decrease in the amount of electricity discharged.

[Positive Electrode Active Material]

The positive electrode active material is lithium composite oxide particles containing nickel and/or cobalt. This is because the use of such lithium composite oxide particles makes it possible to obtain high capacity and high discharge potential. The lithium composite oxide particles are lithium composite oxide particles with a layered rock-salt structure, whose average composition is represented by Chemical Formula (1), for example. The lithium composite oxide particles may be primary particles or secondary particles.

$$Li_aCo_bNi_cM1_{1-b-c}O_d \quad (1)$$

In Chemical Formula (1), M1 is at least one element selected from the group consisting of boron (B), magnesium (Mg), aluminum (Al), silicon (Si), phosphorus (P), sulfur (S), titanium (Ti), chromium (Cr), manganese (Mn), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), tin (Sn), lead (Pb), and antimony (Sb), and a, b, c, and, d are values within ranges of $0.2 \leq a \leq 1.4$, $0 \leq b \leq 1.0$, $0 \leq c \leq 1.0$, and $1.8 \leq d \leq 2.2$, respectively, provided that the composition of lithium varies depending on the state of charge or discharge, and a represents a value in a fully discharged state.

In Chemical Formula (1), the range of a is $0.2 \leq a \leq 1.4$, for example. When the value is smaller, this leads to the collapse of the layered rock-salt structure, the basic crystal structure of the lithium composite oxide. This makes recharging difficult, greatly decreasing the capacity. When the value is larger, lithium is diffused out of the composite oxide particles, obstructing the basicity control in the subsequent process. This also eventually causes adverse effects on the acceleration of gelation during the kneading of a positive electrode paste.

The lithium composite oxide of Chemical Formula (1) may contain lithium in excess of the theoretical amount. For example, the technique disclosed in JP-A-2008-251434, our earlier application, is known in related art. Similarly, in this kind of lithium composite oxide, when the lithium composition a is 1.2 or less, the crystal structure is the same as when a is 1, and this provides the same functions and effects as in the present application.

When the value of a, which represents the lithium composition of the lithium composite oxide of Chemical Formula (1), is more than 1.2, the crystal structure of the lithium composite oxide is almost the same as when a is 1.2 or less. When a is 1.4 or less, the chemical state of the transition metal forming the lithium composite oxide in a redox reaction that accompanies charging and discharging is not largely different from when a is 1.2 or less, and, therefore, the same effects as when a is 1 can be expected.

The ranges of b and c are $0 \leq b \leq 1.0$ and $0 \leq c \leq 1.0$, respectively, for example. When the values are smaller than these ranges, the discharge amount of the positive electrode active material decreases. When the values are larger than these ranges, the stability of the crystal structure of the composite oxide particles is reduced. This causes a decrease in the repeated charging and discharging capacity of the positive electrode active material, and also reduces safety.

The range of d is $1.8 \leq d \leq 2.2$, for example. When the value is smaller or larger than this range, the stability of the crystal structure of the composite oxide particles is reduced. This causes a decrease in the repeated charging and discharging capacity of the positive electrode active material, and also reduces safety. As a result, the discharge amount of the positive electrode active material decreases.

It is also possible to use lithium composite oxide particles having a spinel structure, whose average composition is represented by Chemical Formula (2).

$$Li_hMn_{2-i}M2_iO_j \qquad (2)$$

In Chemical Formula (2), M2 is at least one element selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), and h, i, and j are values within ranges of $0.9 \leq h \leq 1.1$, $0 \leq i \leq 0.6$, and $3.7 \leq j \leq 4.1$, respectively, provided that the composition of lithium varies depending on the state of charge or discharge, and h represents a value in a fully discharged state.

As the lithium composite oxide, a lithium composite oxide containing nickel as a main component is particularly preferable. To contain nickel as a main component means to contain a nickel component in the largest amount among the metal elements forming the lithium composite oxide (except lithium). An example of the lithium composite oxide containing nickel as a main component is one having Chemical Formula (1) in which the content of nickel component in higher than the content of cobalt component, such as a lithium composite oxide having an average composition represented by Chemical Formula (3), wherein c is within a range of $0.5 < c \leq 1.0$.

$$Li_aCo_bNi_cM1_{1-b-c}O_d \qquad (3)$$

In Chemical Formula (3), M1 is at least one element selected from the group consisting of boron (B), magnesium (Mg), aluminum (Al), silicon (Si), phosphorus (P), sulfur (S), titanium (Ti), chromium (Cr), manganese (Mn), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), tin (Sn), lead (Pb), and antimony (Sb), and a, b, c, and, d are values within ranges of $0.2 \leq a \leq 1.4$, $0 \leq b < 0.5$, $0.5 < c \leq 1.0$, and $1.8 \leq d \leq 2.2$, respectively, provided that the composition of lithium varies depending on the state of charge or discharge, and a represents a value in a fully discharged state.

The lithium composite oxide having an average composition represented by Chemical Formula (3) is a lithium composite oxide for lithium secondary batteries, which can realize high voltage and high energy density almost equal to those given by a lithium composite oxide containing cobalt as a main component.

As compared with a lithium composite oxide containing cobalt as a main component, a lithium composite oxide containing nickel as a main component has a lower content of cobalt, which is unstable in terms of resource and expensive, and thus is more economical. Further, as compared with a lithium composite oxide containing cobalt as a main component, a lithium composite oxide containing nickel as a main component has higher battery capacity; it is desirable to further expand this advantage.

Meanwhile, with respect to a secondary battery in which a lithium composite oxide containing nickel as a main component is used as the positive electrode active material, there is a problem that the internal pressure increases with gas generation inside the battery. When a laminate film is used as the outer packaging material of the secondary battery, there is a problem that battery swelling is likely to occur accompanying gas generation inside the battery. It is desirable to solve these problems.

[Suppression of Gas Generation]

The following describes gas generation and the mechanism of the suppression of gas generation.

According to the accepted theory, the involvement of a positive electrode active material in gas generation inside a nonaqueous electrolyte battery is attributed to the following Factor 1 and Factor 2.

(Factor 1)

With an acid component from the nonaqueous electrolytic solution, the carbonate contained in the positive electrode active material produces carbon dioxide.

(Factor 2)

Due to the strong oxidation power of the positive electrode active material in a charged state, organic matters in the nonaqueous electrolytic solution or the like are oxidized, producing carbon dioxide or carbon monoxide.

Therefore, it is believed that the suppression of gas generation can be achieved by an effective treatment to reduce the carbonate content of the positive electrode active material together with an effective treatment to suppress the oxidation activity on the surface of the positive electrode active material by treating the surface of the positive electrode active material. In the related art, it has been suggested that in the correlation between the amount of residual carbonate and swelling, the amount of swelling tends to be large in a system having a large amount of residual carbonate, while the amount of swelling tends to be small in a system having a small amount of residual carbonate.

In contrast, even when the amount of residual carbonate is somewhat large, it tends not to be directly reflected in swelling. This suggests that the residual carbonate is not always decomposed to produce $CO_2$, and that when the oxidation of organic matters in a nonaqueous electrolytic solution or the like is sufficiently suppressed, swelling can be suppressed as a whole. Also, in order to suppressing swelling, the residual carbonate content of the positive electrode is preferably lower.

[Particle Diameter]

The positive electrode active material preferably has an average particle diameter of 2.0 µm or more and 50 µm or less. When the average particle diameter is less than 2.0 µm, this causes detachment of the positive electrode active material layer during the pressing of the positive electrode active material layer in the production of a positive electrode. Further, the surface area of the positive electrode active material increases, requiring an increase in the amount of conductive material or binder to be added, whereby the energy density per unit weight will decrease. When the average particle diameter is more than 50 µm, it is likely that the particles pass through the separator, causing a short circuit.

[Heteropoly Acid and Heteropoly Acid Compound]

A heteropoly acid is a condensate of two or more kinds of oxo acids. Preferred examples of such heteropoly acids and heteropoly acid compounds are those easily soluble in the solvent of a battery, such as those having heteropoly acid ions with the Keggin structure, the Anderson structure, or the Dawson structure.

The heteropoly acid and/or heteropoly acid compound is one having a polyatom selected from Element Group (a); or one having a polyatom selected from the following Element Group (a), with the polyatom being partially substituted with at least one element selected from Element Group (b).

Element Group (a): Mo, W, Nb, and V

Element Group (b): Ti, Cr, Mn, Fe, Co, Ni, Cu, Zn, Ga, Zr, Tc, Rh, Cd, In, Sn, Ta, Re, Tl, and Pb The heteropoly acid and/or heteropoly acid compound may also be one having a heteroatom selected from Element Group (c); or one having a heteroatom selected from Element Group (c), with the heteroatom being partially substituted with at least one element selected from Element Group (d).

Element Group (c): B, Al, Si, P, Cr, Mn, Fe, Co, Ni, Cu, Zn, Ge, and As

Element Group (d): H, Be, B, C, Na, Al, Si, P, S, Ti, V, Cr, Mn, Fe, Co, Ni, Cu, Zn, Ga, Ge, As, Se, Zr, Rh, Sn, Sb, Te, I, Re, Pt, Bi, Ce, Th, U, and Np Examples of heteropoly acids include heteropolytungstic acids, such as phosphotungstic acid and silicotungstic acid, and heteropolymolybdic acids, such as phosphomolybdic acid and silicomolybdic acid. Examples of heteropoly acid compounds include heteropolytungstic acid compounds such as sodium silicotungstate, sodium phosphotungstate, and ammonium phosphotungstate. Examples of heteropoly acid compounds also include heteropolymolybdic acid compounds, such as sodium phosphomolybdate and ammonium phosphomolybdate. It is also possible to use a mixture of two or more kinds of these heteropoly acids and heteropoly acid compounds. These heteropoly acids and heteropoly acid compounds are less likely to have adverse effects; for example, they hardly react with other materials. Phosphotungstic acid, silicotungstic acid, phosphomolybdic acid, and silicomolybdic acid have particularly high solubility in solvents, and thus can be advantageously used.

The optimal range of the amount of the heteropoly acid and/or heteropoly acid compound to be used is 0.01 wt % or more and 5.0 wt % or less, preferably 0.05 wt % or more and 5.0 wt % or less, more preferably 0.1 wt % or more and 5.0 wt % or less, based on 100 wt % of the amount of the positive electrode active material to be used. The weight of a heteropoly acid does not include the weight of bound water in the heteropoly acid. Likewise, the weight of a heteropoly acid compound does not include the weight of bound water in the heteropoly acid compound.

When the heteropoly acid and/or heteropoly acid compound is added in excess of the optimal range of the amount of the heteropoly acid and/or heteropoly acid compound to be used, the discharge amount decreases, and also swelling occurs. Thus, no effect is seen on the improvement of reduction. On the other hand, when the heteropoly acid and/or heteropoly acid compound is used in an amount less than the optimal range, no effect is seen on the reduction of the amount of swelling.

The optimal range of the amount of the phosphorous acid to be added with the heteropoly acid and/or heteropoly acid compound is 0.01 wt % or more and 5.0 wt % or less, preferably 0.05 wt % or more and 5.0 wt % or less, more preferably 0.1 wt % or more and 5.0 wt % or less, based on 100 wt % of the amount of the positive electrode active material to be used.

Also in the case of phosphorous acid, when the phosphorous acid is added in excess of the optimal range of the amount of the phosphorous acid to be used, the discharge amount decreases, and also swelling occurs. Thus, no effect is seen on the improvement of reduction. On the other hand, when the phosphorous acid is used in an amount less than the optimal range, no effect is seen on the reduction of the amount of swelling.

Such a positive electrode 13 preferably has a thickness of 250 µm or less.

[Negative Electrode]

The negative electrode 14 includes a negative electrode collector 14A and a negative electrode active material layer 14B disposed on each side of the negative electrode collector 14A, for example. The negative electrode collector 14A is made of a metallic foil, such as copper foil, for example.

The negative electrode active material layer 14B includes, as a negative electrode active material, at least one kind of negative electrode material capable of intercalating and deintercalating lithium, for example. The negative electrode active material layer 14B may also include an electrically conductive aid and a binder as required.

Examples of negative electrode materials capable of intercalating and deintercalating lithium include carbon materials such as graphite, non-graphitizable carbon, and graphitizable carbon. Such a carbon material may be used alone, or a mixture of two or more kinds of carbon materials may also be used. It is also possible to use a mixture of two or more kinds having different average particle diameters.

Other examples of negative electrode materials capable of intercalating and deintercalating lithium include materials containing, as a constituent element, a metal element or a metalloid element capable of forming an alloy with lithium. Specific examples thereof are a simple substance of a metal element capable of forming an alloy with lithium, an alloyed metal element, and a metal element compound; a simple substance of a metalloid element capable of forming an alloy with lithium, an alloyed metalloid element, and a metalloid element compound; and materials at least partially having one or more such phases.

Examples of such metal elements and metalloid elements include tin (Sn), lead (Pb), aluminum, indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), and hafnium (Hf). In particular, metal elements and metalloid elements of Group 14 of the long form of the periodic table are preferable, and silicon (Si) and tin (Sn) are particularly preferable. This is because silicon (Si) and tin (Sn) have a high capability of intercalating and deintercalating lithium, and high energy density can be obtained.

Examples of alloys of silicon (Si) include those containing, as a second constituent element other than silicon (Si), at least one kind selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of alloys of tin (Sn) include those containing, as a second constituent element other than tin (Sn), at least one element selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of compounds of silicon (Si) and compounds of tin (Sn) include those containing oxygen (O) or carbon (C). Such a compound may also contain, in addition to silicon (Si) or tin (Sn), any of the second constituent elements mentioned above.

[Separator]

The separator 15 is not limited as long as it is electrically stable, is chemically stable to the positive electrode active material, the negative electrode active material, or the solvent, and has no electrical conductivity. For example, a polymeric non-woven fabric, a porous film, and glass or ceramic fibers in the form of paper are usable. It is also possible to use a stack of a plurality of layers of such materials. In particular, a porous polyolefin film is preferable. A combination of a porous polyolefin film with a heat-resistant material made of polyimide, glass, or ceramic fibers, for example, is also usable.

[Electrolyte]

The electrolyte 16 includes an electrolytic solution and a support material containing a polymer compound holding the electrolytic solution, and is in the form of a so-called gel. The electrolytic solution includes an electrolyte salt and a solvent that dissolves the electrolyte salt. Examples electrolyte salts include lithium salts such as $LiPF_6$, $LiClO_4$, $LiBF_4$, $LiN(SO_2CF_3)_2$, $LiN(SO_2C_2F_5)_2$, and $LiAsF_6$. Such an electrolyte salt may be used alone or in combination with others.

The solvent may be a nonaqueous solvent, examples thereof including lactone solvents, such as γ-butyrolactone, γ-valerolactone, δ-valerolactone, and ε-caprolactone; carbonic acid ester solvents, such as ethylene carbonate, propylene carbonate, butylene carbonate, vinylene carbonate, dimethyl carbonate, ethyl methyl carbonate, and diethyl carbonate; ether solvents, such as 1,2-dimethoxyethane, 1-ethoxy-2-methoxyethane, 1,2-diethoxyethane, tetrahydrofuran, and 2-methyltetrahydrofuran; nitrile solvents, such as acetonitrile; sulfolane solvents; phosphoric acids; phosphoric acid ester solvents; and pyrrolidones. Such a solvent may be used alone, or a mixture of two or more kinds of solvents may also be used.

The solvent preferably includes a compound in which hydrogen in a cyclic or linear ester is partially or fully fluorinated. A preferred example of such a fluorinated compound is difluoroethylene carbonate (4,5-difluoro-1,3-dioxolan-2-one). This is because the charge/discharge cycle characteristics can be improved even when the negative electrode 14 contains a compound of silicon (Si), tin (Sn), germanium (Ge), or the like in the negative electrode active material, and difluoroethylene carbonate is particularly effective in improving the cycle characteristics.

The polymer compound may be any compound as long as it absorbs the solvent and causes gelation, examples thereof including fluorine-based polymer compounds such as copolymers of polyvinylidene fluoride or vinylidene fluoride and hexafluoropropylene; ether-based polymer compounds such as polyethylene oxide and cross-linked products containing polyethylene oxide; and compounds containing polyacrylonitrile, polypropylene oxide, or polymethyl methacrylate as a repeating unit. Such a polymer compound may be used alone, or a mixture of two or more kinds of polymer compounds may also be used.

In particular, fluorine-based polymer compounds are preferable in terms of redox stability. A copolymer containing vinylidene fluoride and hexafluoropropylene as components is particularly preferable. Further, such a copolymer may also contain, as a component, a monoester of an unsaturated dibasic acid, such as monomethyl maleate; a halogenated ethylene, such as chlorotrifluoroethylene; a cyclic carbonate of an unsaturated compound, such as vinylene carbonate; an epoxy-group-containing acrylic vinyl monomer; etc. This is because higher characteristics can be obtained thereby.

1-2. Method for Producing Nonaqueous Electrolyte Battery

The following describes a method for producing a nonaqueous electrolyte battery.

[Method for Producing Positive Electrode]

A positive electrode 13 is produced as follows. First, a positive electrode active material, a binder, an electrically conductive aid such as a carbon material, a heteropoly acid and/or heteropoly acid compound, and phosphorous acid are mixed to prepare a positive electrode mixture. The positive electrode mixture is dispersed in a solvent, such as N-methyl-2-pyrrolidone, thereby producing a positive electrode mixture slurry. Polyvinylidene fluoride, polytetrafluoroethylene, or the like is used as the binder.

More specifically, for example, first, a positive electrode active material, a binder, and an electrically conductive aid are mixed. Also, a heteropoly acid and/or heteropoly acid compound and phosphorous acid are dissolved in a solvent, such as N-methyl-2-pyrrolidone, to prepare a solution. Next, the solution and the mixture are mixed to prepare a positive electrode mixture.

Next, a solvent, such as N-methyl-2-pyrrolidone, is further added to the positive electrode mixture to disperse the positive electrode active material, the binder, the electrically conductive aid, the heteropoly acid and/or heteropoly acid compound, and the phosphorous acid in the solvent. A positive electrode mixture slurry is thus obtained.

Next, the positive electrode mixture slurry is applied to a positive electrode collector 13A, dried, and then pressed with a roll press or the like into a positive electrode active material layer 13B. The positive electrode 13 is thus obtained. The electrically conductive aid, such as a carbon material, is optionally mixed at the time of the preparation of the positive electrode mixture.

[Method for Producing Negative Electrode]

Next, a negative electrode 14 is produced as follows. First, a negative electrode active material and a binder are mixed to prepare a negative electrode mixture, and the negative electrode mixture is dispersed in a solvent, such as N-methyl-2-pyrrolidone, to give a negative electrode mixture slurry. Next, the negative electrode mixture slurry is applied to a negative electrode collector 14A, followed by drying the solvent, and then pressed with a roll press or the like into a negative electrode active material layer 14B. The negative electrode 14 is thus obtained.

[Method for Producing Nonaqueous Electrolyte Battery]

The nonaqueous electrolyte battery can be produced as follows, for example. First, a precursor solution containing an electrolytic solution, a polymer compound, and a mixed solvent is applied to each of the positive electrode 13 and the negative electrode 14. The mixed solvent is then volatilized to form an electrolyte 16. Subsequently, a positive electrode lead 11 is attached to an end portion of the positive electrode collector 13A by welding, and a negative electrode lead 12 is attached to an end portion of the negative electrode collector 14A by welding.

Next, the positive electrode 13 and the negative electrode 14 each having formed thereon the electrolyte 16 are laminated via a separator 15 to give a laminate, and the laminate is then wound in its longitudinal direction. A protection tape 17 is attached to the outermost periphery thereof to form a wound electrode assembly 10. Finally, for example, the wound electrode assembly 10 is wrapped in an outer packaging member 1, and the marginal portions of the outer packaging member 1 are brought into close contact by heat sealing or the like to enclose the wound electrode assembly 10 therein. At this time, an adhesion film 2 is inserted between the positive electrode lead 11 and the outer packaging member 1 and also between the negative electrode lead 12 and the outer packaging member 1. The nonaqueous electrolyte battery shown in FIGS. 1 and 2 is thus completed.

The nonaqueous electrolyte battery may also be produced as follows. First, a positive electrode 13 and a negative electrode 14 are produced as above, and a positive electrode lead 11 and a negative electrode lead 12 are attached to the positive electrode 13 and the negative electrode 14, respectively. Then, the positive electrode 13 and the negative electrode 14 are laminated via a separator 15, the resulting laminate is wound, and a protection tape 17 is attached to the outermost periphery thereof to form a wound electrode assembly that is a precursor of a wound electrode assembly 10. Next, the wound electrode assembly is wrapped in an outer packaging member 1, and the marginal portions thereof except one side is heat-sealed into a pouch-like shape so that the assembly is housed in the outer packaging member 1. Subsequently, an electrolyte-forming composition containing an electrolytic solution, a monomer that is the raw material of a polymer compound, a polymerization initiator, and optionally a polymerization inhibitor or other materials is prepared, and the composition is poured into the outer packaging member 1.

After the electrolyte-forming composition is poured, the opening of the outer packaging member 1 is hermetically sealed by heat sealing in a vacuum atmosphere. Next, heat is applied thereto so that the monomer is polymerized to produce a polymer compound, thereby forming a gel electrolyte 16. The nonaqueous electrolyte battery shown in FIGS. 1 and 2 is thus assembled.

[Effect]

The nonaqueous electrolyte battery according to the first embodiment makes it possible to reduce gas generation therein. Further, because gas generation inside the battery can be reduced, battery swelling can be suppressed.

2. Second Embodiment

Second Example of a Nonaqueous Electrolyte Battery

The following describes a second embodiment of the invention. A nonaqueous electrolyte battery according to the second embodiment uses an electrolytic solution in place of the gel electrolyte 16 in the nonaqueous electrolyte battery of the first embodiment. In this case, a separator 15 is impregnated with the electrolytic solution. The electrolytic solution may be the same electrolytic solution as in the first embodiment.

The nonaqueous electrolyte battery having such a configuration can be produced as follows, for example. First, a positive electrode 13 and a negative electrode 14 are produced. The production of the positive electrode 13 and the negative electrode 14 is the same as in the first embodiment, so a detailed description is omitted here.

Next, a positive electrode lead 11 and a negative electrode lead 12 are attached to the positive electrode 13 and the negative electrode 14, respectively. The positive electrode 13 and the negative electrode 14 are then laminated via a separator 15, the resulting laminate is wound, and a protection tape 17 is attached to the outermost periphery thereof.

A wound electrode assembly is thus obtained. The wound electrode assembly has the configuration of the wound electrode assembly 10 with the electrolyte 16 being omitted. The wound electrode assembly is wrapped in an outer packaging member 1, then an electrolytic solution is poured therein, and the outer packaging member 1 is hermetically sealed. The nonaqueous electrolyte battery according to the second embodiment of the invention is thus obtained.

[Effect]

The second embodiment has the same effects as the first embodiment. That is, in the second embodiment of the invention, gas generation of the electrolytic solution is suppressed, and battery swelling can be suppressed.

3. Third Embodiment

Third Example of a Nonaqueous Electrolyte Battery

Figure 3:
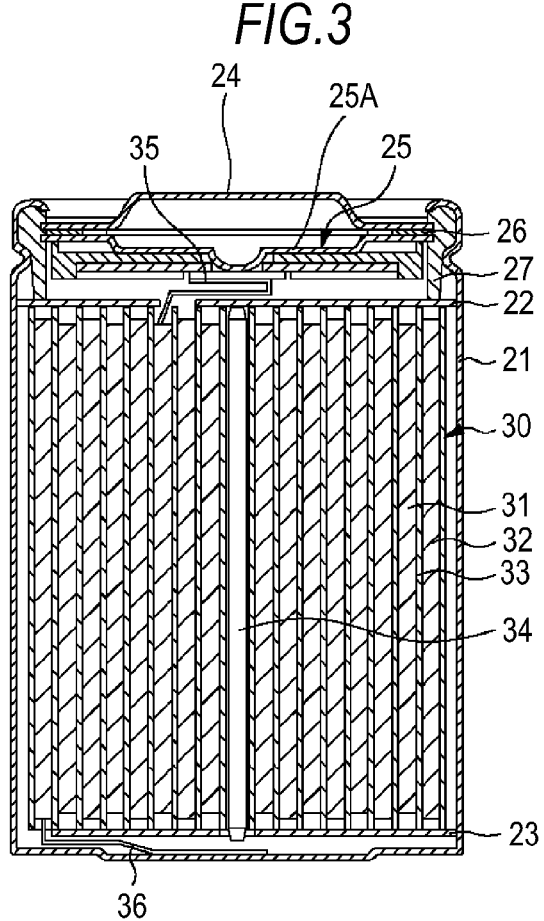
FIG. 3 is a cross-sectional view showing an example of the configuration of a nonaqueous electrolyte battery according to another embodiment.
Figure 4:
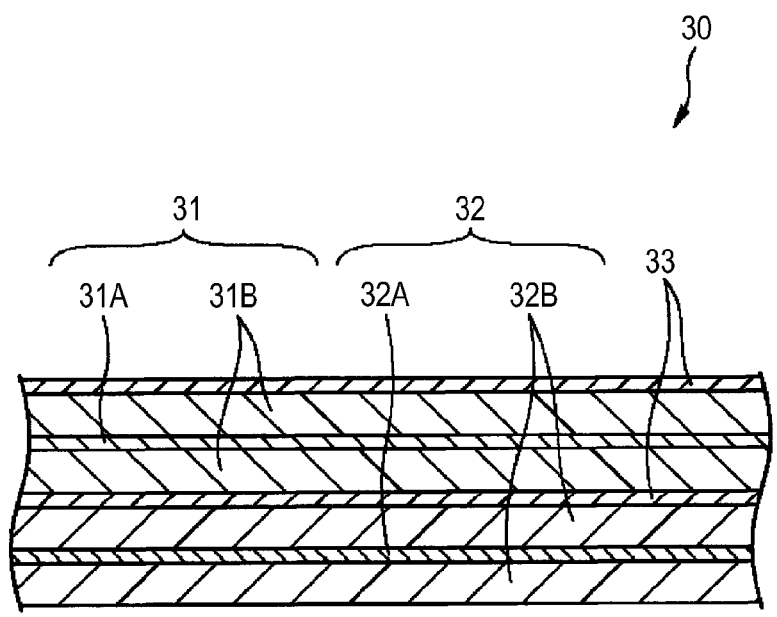
FIG. 4 is an enlarged cross-sectional view of a part of a wound electrode assembly 30 shown in FIG. 3.

The following describes the configuration of a nonaqueous electrolyte battery according to a third embodiment with reference to FIGS. 3 and 4. FIG. 3 shows the configuration of the nonaqueous electrolyte battery according to the third embodiment.

3-1. Configuration of Nonaqueous Electrolyte Battery

The nonaqueous electrolyte battery is a so-called cylindrical battery. It includes an wound electrode assembly 30 obtained by winding a strip-like positive electrode 31 and a strip-like negative electrode 32 via a separator 33, which is housed in a battery can 21 in the form of an approximately hollow cylinder.

The separator 33 is impregnated with an electrolytic solution which is a liquid electrolyte. The battery can 21 is made of iron (Fe) plated with nickel (Ni), for example. One end portion thereof is closed, and the other end portion is open. Inside the battery can 21, a pair of insulating plates 22 and 23 are arranged perpendicularly to the peripheral winding surface in such a manner that the wound electrode assembly 30 is sandwiched therebetween.

The open end portion of the battery can 21 has attached thereto, by caulking via a gasket 27, a battery cover 24, a safety valve mechanism 25, and a PTC (Positive Temperature Coefficient) device 26. The valve mechanism 25 and the PTC device 26 are disposed on the inside of the battery cover 24. The interior of the battery can 21 is thus hermetically sealed.

The battery cover 24 is made of the same material as the battery can 21, for example. The safety valve mechanism 25 is electrically connected to the battery cover 24 via the PTC device 26. The safety valve mechanism 25 is configured such that when the internal pressure of the battery reaches a certain level or higher due to an internal short circuit, external heating, or the like, a disk plate 25A is turned over to cut the electrical connection between the battery cover 24 and the wound electrode assembly 30.

With an increase in temperature, the resistance of the PTC device 26 increases to limit the current, thereby preventing abnormal heat generation due to a high current. The gasket 27 is made of an insulating material, and the surface thereof is coated with asphalt, for example.

The wound electrode assembly 30 has a winding around a center pin 34, for example. A positive electrode lead 35 made of aluminum (Al) or the like is connected to the positive electrode 31 of the wound electrode assembly 30, and a negative electrode lead 36 made of nickel (Ni) or the like is connected to the negative electrode 32. The positive electrode lead 35 is welded to the safety valve mechanism 25 and is thereby electrically connected to the battery cover 24. The negative electrode lead 36 is welded and electrically connected to the battery can 21.

FIG. 4 is an enlarged cross-sectional view of a part of the wound electrode assembly 30 shown in FIG. 3. The wound electrode assembly 30 is formed by laminating the positive electrode 31 and the negative electrode 32 via the separator 33, and winding the resulting laminate.

The positive electrode 31 includes a positive electrode collector 31A and a positive electrode active material layer 31B disposed on each side of the positive electrode collector 31A, for example. The negative electrode 32 includes a negative electrode collector 32A and a negative electrode active material layer 32B disposed on each side of the negative electrode collector 32A, for example. The positive electrode collector 31A, the positive electrode active material layer 31B, the negative electrode collector 32A, the negative electrode active material layer 32B, the separator 33, and the electrolytic solution are configured the same as the positive electrode collector 13A, the positive electrode active material layer 13B, the negative electrode collector 14A, the negative electrode active material layer 14B, the separator 15, and the electrolytic solution of the first embodiment, respectively.

3-2. Method for Producing Nonaqueous Electrolyte Battery

The following describes a method for producing the nonaqueous electrolyte battery according to the third embodiment. The positive electrode 31 is produced as follows. First, a positive electrode active material, a binder, a heteropoly acid and/or heteropoly acid compound, and phosphorous acid are mixed to prepare a positive electrode mixture. The positive electrode mixture is then dispersed in a solvent, such as N-methyl-2-pyrrolidone, thereby producing a positive electrode mixture slurry. Next, the positive electrode mixture slurry is applied to a positive electrode collector 31A, dried, and then pressed with a roll press or the like into a positive electrode active material layer 31B. The positive electrode 31 is thus obtained. The amount of the heteropoly acid and/or heteropoly acid compound to be used is the same as in the first embodiment, so a detailed description is omitted here. A detailed description of the amount of the phosphorous acid to be used is also omitted.

The negative electrode 32 is produced as follows. First, a negative electrode active material and a binder are mixed to prepare a negative electrode mixture, and the negative electrode mixture is dispersed in a solvent, such as N-methyl-2-pyrrolidone, to give a negative electrode mixture slurry. Next, the negative electrode mixture slurry is applied to a negative electrode collector 32A, followed by drying of the solvent, and then pressed with a roll press or the like into a negative electrode active material layer 32B. The negative electrode 32 is thus obtained.

Next, a positive electrode lead 35 is attached to the positive electrode collector 31A by welding or the like, and a negative electrode lead 36 is attached to the negative electrode collector 32A by welding or the like. Subsequently, the positive electrode 31 and the negative electrode 32 are wound via a separator 33. An end portion of the positive electrode lead 35 is then welded to a safety valve mechanism 25, while an end portion of the negative electrode lead 36 is welded to a battery can 21.

Then, the positive electrode 31 and the negative electrode 32 wound via the separator 33 are sandwiched between a pair of insulating plates 22 and 23, and housed in the battery can 21. After the positive electrode 31 and the negative electrode 32 are housed in the battery can 21, an electrolyte is poured into the battery can 21 to impregnate the separator 33 with the electrolyte.

Subsequently, the battery cover 24, the safety valve mechanism 25, and a PTC device 26 are fixed to the open end portion of the battery can 21 by caulking via a gasket 27. The nonaqueous electrolyte battery shown in FIG. 3 is thus produced.

[Effect]

In the nonaqueous electrolyte battery according to the third embodiment, gas generation is suppressed, whereby breakage due to an increase in the internal pressure can be suppressed.

4. Fourth Embodiment

Fourth Example of a Nonaqueous Electrolyte Battery

Figure 5:
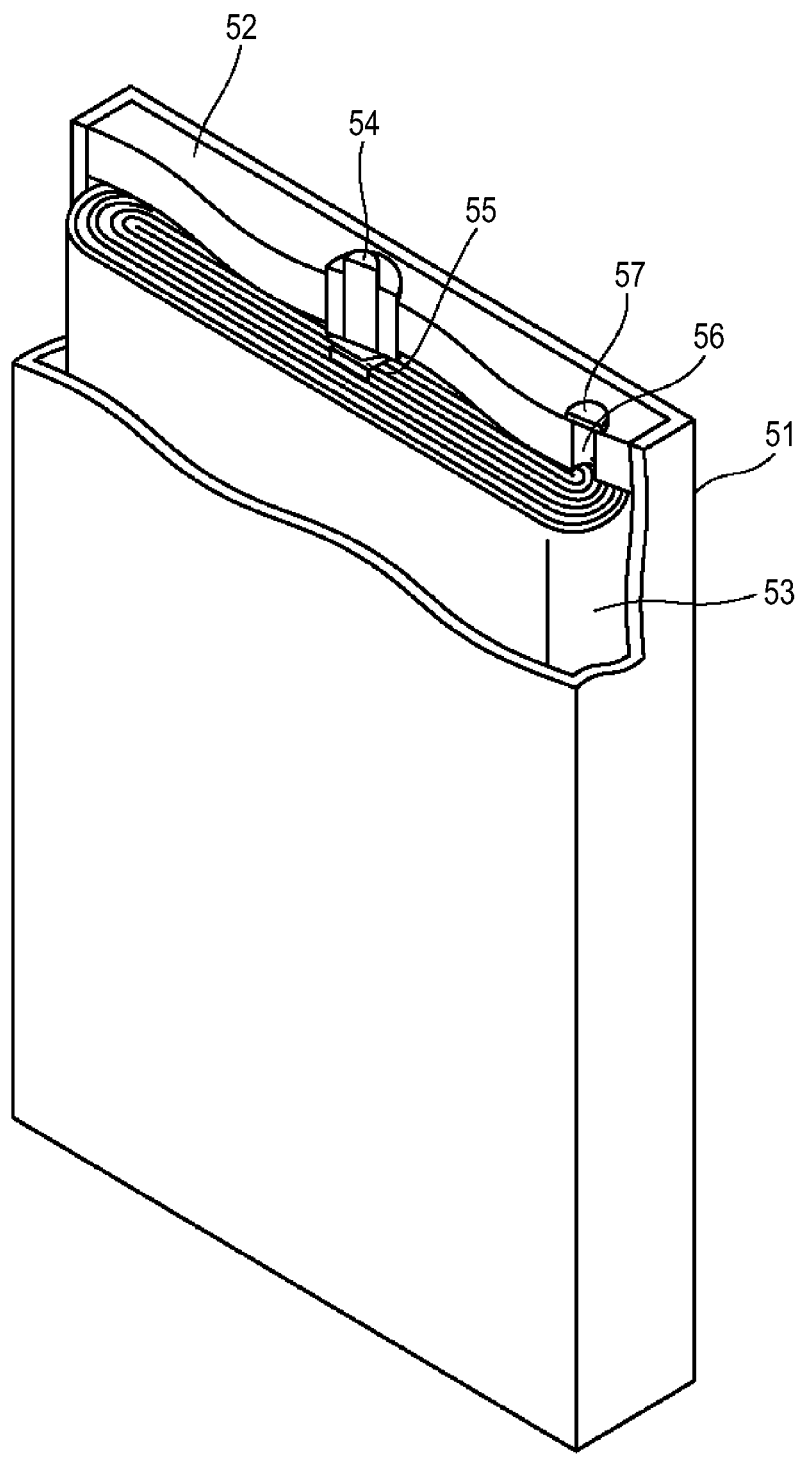
FIG. 5 is a cross-sectional view showing an example of the configuration of a nonaqueous electrolyte battery according to another embodiment.

The following describes a configuration example of a nonaqueous electrolyte battery according to a fourth embodiment. The nonaqueous electrolyte battery according to the fourth embodiment has a prismatic shape as shown in FIG. 5.

The nonaqueous electrolyte battery is produced as follows. As shown in FIG. 5, first, a wound electrode assembly 53 is placed in an outer packaging can 51. The outer packaging can 51 is a prismatic can made of a metal, such as aluminum (Al) or iron (Fe), for example.

Then, an electrode pin 54 disposed in a battery cover 52 is connected to an electrode terminal 55 taken from the wound electrode assembly 53, and then the can is closed with the battery cover 52. An electrolytic solution is poured therein from an electrolytic solution inlet 56, and the inlet is then sealed with a sealing member 57. The nonaqueous electrolyte battery is thus obtained.

The wound electrode assembly 53 is obtained by laminating a positive electrode and a negative electrode via a separator, and winding the resulting laminate. The positive electrode, the negative electrode, the separator, and the electrolytic solution are the same as in the first embodiment, so a detailed description is omitted here.

[Effect]

In the nonaqueous electrolyte battery according to the fourth embodiment, gas generation of the electrolytic solution is suppressed, whereby breakage due to an increase in the internal pressure caused by gas generation can be suppressed.

5. Other Embodiments

Variations

The shape of the nonaqueous electrolyte battery is not limited to the above-mentioned examples. For example, it may be a coin-shaped battery.

Further, for example, it is also possible to use as the electrolyte a solid polymer electrolyte made of an ion-conductive polymer material, an inorganic solid electrolyte made of an ion-conductive inorganic material, or the like. Examples of ion-conductive polymer materials include polyether, polyester, polyphosphazene, and polysiloxane. Examples of inorganic solid electrolytes include ion-conductive ceramics, ion-conductive crystals, and ion-conductive glasses.

EXAMPLES

The embodiments will be described in further detail with reference to the following non-limiting Examples.

Example 1

In the following Example 1, secondary batteries were produced using phosphomolybdic acid as a heteropoly acid. The weight of phosphomolybdic acid does not include the weight of bound water in the phosphomolybdic acid.

<Sample 1-1>

First, 90 parts by mass of a positive electrode active material made of composite oxide particles having an average composition $Li_{1.02}Co_{0.20}Ni_{0.77}Al_{0.03}O_2$ and an average particle diameter of 14 μm as measured by laser scattering, 5 parts by mass of graphite as an electric conductor, and 5 parts by mass of polyvinylidene fluoride as a binder were mixed.

Subsequently, phosphomolybdic acid $(H_3(PMo_{12}O_{40}))$ and phosphorous acid $(H_3PO_3)$ were dissolved in N-methyl-2-pyrrolidone to produce a 10 wt % solution. Then, the solution was added to the above mixture; the amounts of phosphomolybdic acid and phosphorous acid added were each equivalent to 0.05 wt % of the positive electrode active material. Further, a desired amount of N-methyl-2-pyrrolidone, a dispersion medium, was added to the mixture to cause dispersion, thereby producing a positive electrode mixture in the form of a slurry.

The positive electrode mixture slurry was uniformly applied to each side of a positive electrode collector made of a 20-μm-thick aluminum foil, dried, and then pressed with a roll press into a positive electrode active material layer. A positive electrode was thus produced. Subsequently, a positive terminal was attached to a portion of the positive electrode where the positive electrode collector was exposed.

Next, 95 parts by mass of a pulverized graphite powder as a negative electrode active material and 5 parts by mass of polyvinylidene fluoride as a binder were mixed to prepare a negative electrode mixture. The negative electrode mixture was then dispersed in N-methyl-2-pyrrolidone, a dispersion medium, to give a negative electrode mixture slurry. Next, the negative electrode mixture slurry was uniformly applied to each side of a negative electrode collector made of a 15-μm-thick copper foil, dried, and then pressed with a roll press into a negative electrode active material layer. A negative electrode was thus produced. Subsequently, a negative terminal was attached to a portion of the negative electrode where the negative electrode collector is exposed.

Next, the positive electrode and the negative electrode were brought into close contact with each other via a separator formed of a 25-μm-thick microporous polyethylene film, and wound in the longitudinal direction. A protection tape was attached to the outermost periphery thereof, thereby producing a wound electrode assembly. Subsequently, the wound electrode assembly was wrapped in an outer packaging material, and the three sides of the outer packaging material were heat-sealed, with one side being not heat-sealed to define an opening. The outer packaging material was a moisture-proof aluminum laminate film formed of a laminate including, from the outermost layer, a 25-μm-thick nylon film, a 40-μm-thick aluminum foil, and a 30-μm-thick polypropylene film.

Subsequently, in a solvent obtained by mixing ethylene carbonate (EC) and ethyl methyl carbonate (EMC) in a mass ratio of 5:5, lithium hexafluorophosphate $(LiPF_6)$ was dissolved as an electrolyte salt to a concentration of 1 mol/l, thereby producing an electrolytic solution. The electrolytic solution was poured into the outer packaging material from the opening, and the remaining side of the outer packaging material was hermetically sealed by heat sealing under reduced pressure. A secondary battery was thus produced.

<Sample 1-2>

A secondary battery was produced in the same manner as in the production of Sample 1-1, except that the amounts of phosphomolybdic acid and phosphorous acid added were each 0.50 wt % of the positive electrode active material.

<Sample 1-3>

A secondary battery was produced in the same manner as in the production of Sample 1-1, except that the amount of phosphomolybdic acid added was 0.70 wt % of the positive electrode active material, and that the amount of phosphorous acid added was 0.30 wt % of the positive electrode active material.

<Sample 1-4>

A secondary battery was produced in the same manner as in the production of Sample 1-1, except that the amount of phosphomolybdic acid added was 1.0 wt % of the positive electrode active material, and that no phosphorous acid was added.

<Sample 1-5>

A secondary battery was produced in the same manner as in the production of Sample 1-1, except that the amount of phosphorous acid added was 1.0 wt % of the positive electrode active material, and that no phosphomolybdic acid was added.

<Sample 1-6>

A secondary battery was produced in the same manner as in the production of Sample 1-1, except that the amount of phosphomolybdic acid added was 5.5 wt % of the positive electrode active material, and that the amount of phosphorous acid added was 0.50 wt % of the positive electrode active material.

<Sample 1-7>

A secondary battery was produced in the same manner as in the production of Sample 1-1, except that the amount of phosphomolybdic acid added was 0.50 wt % of the positive electrode active material, and that the amount of phosphorous acid added was 5.5 wt % of the positive electrode active material.

<Sample 1-8>

A secondary battery was produced in the same manner as in the production of Sample 1-1, except that a positive electrode active material made of composite oxide particles having an average composition $Li_{1.02}Co_{0.98}Mg_{0.01}Al_{0.01}O_2$ and an average particle diameter of 13 µm as measured by laser scattering was used, and that the amounts of phosphomolybdic acid and phosphorous acid added were each 0.25 wt % of the positive electrode active material.

<Sample 1-9>

A secondary battery was produced in the same manner as in the production of Sample 1-1, except that the same positive electrode active material as used for Sample 8 made of composite oxide particles with an average composition represented by $Li_{1.02}Co_{0.98}Mg_{0.01}Al_{0.01}O_2$ was used, that the amount of phosphomolybdic acid added was 0.30 wt % of the positive electrode active material, and that the amount of phosphorous acid added was 0.20 wt % of the positive electrode active material.

<Sample 1-10>

A secondary battery was produced in the same manner as in the production of Sample 1-1, except that the same positive electrode active material as used for Sample 8 made of composite oxide particles with an average composition represented by $Li_{1.02}Co_{0.98}Mg_{0.01}Al_{0.01}O_2$ was used, that the amount of phosphomolybdic acid added was 0.50 wt % of the positive electrode active material, and that no phosphorous acid was added.

<Sample 1-11>

A secondary battery was produced in the same manner as in the production of Sample 1-1, except that the same positive electrode active material as used for Sample 8 made of composite oxide particles with an average composition represented by $Li_{10.2}Co_{0.98}Mg_{0.01}Al_{0.01}O_2$ was used, that the amount of phosphorous acid added was 0.50 wt % of the positive electrode active material, and that no phosphomolybdic acid was added.

<Sample 1-12>

A secondary battery was produced in the same manner as in the production of Sample 1-1, except that a positive electrode active material made of composite oxide particles having an average composition $Li_{0.98}Co_{0.15}Ni_{0.80}Al_{0.05}O_2$ and an average particle diameter of 13 µm as measured by laser scattering was used, and that the amounts of phosphomolybdic acid and phosphorous acid added were each 0.10 wt % of the positive electrode active material.

<Sample 1-13>

A secondary battery was produced in the same manner as in the production of Sample 1-1, except that the same positive electrode active material as used for Sample 12 made of composite oxide particles with an average composition represented by $Li_{0.98}Co_{0.15}Ni_{0.80}Al_{0.05}O_2$ was used, that the amount of phosphomolybdic acid added was 0.15 wt % of the positive electrode active material, and that the amount of phosphorous acid added was 0.05 wt % of the positive electrode active material.

<Sample 1-14>

A secondary battery was produced in the same manner as in the production of Sample 1-1, except that the same positive electrode active material as used for Sample 12 made of composite oxide particles with an average composition represented by $Li_{0.98}Co_{0.15}Ni_{0.80}Al_{0.05}O_2$ was used, that the amount of phosphomolybdic acid added was 0.20 wt % of the positive electrode active material, and that no phosphorous acid was added.

<Sample 1-15>

A secondary battery was produced in the same manner as in the production of Sample 1-1, except that the same positive electrode active material as used for Sample 12 made of composite oxide particles with an average composition represented by $Li_{0.98}Co_{0.15}Ni_{0.80}Al_{0.05}O_2$ was used, that the amount of phosphorous acid added was 0.20 wt % of the positive electrode active material, and that no phosphomolybdic acid was added.

<Sample 1-16>

A secondary battery was produced in the same manner as in the production of Sample 1-1, except that in addition to phosphomolybdic acid and phosphorous acid, silicotungstic acid was added in an amount of 0.05 wt % of the positive electrode active material.

<Sample 1-17>

A secondary battery was produced in the same manner as in the production of Sample 1-1, except that the amount of phosphomolybdic acid added was 0.01 wt % of the positive electrode active material, and that the amount of phosphorous acid added was 0.5 wt % of the positive electrode active material.

<Sample 1-18>

A secondary battery was produced in the same manner as in the production of Sample 1-1, except that the amount of phosphomolybdic acid added was 0.50 wt % of the positive electrode active material, and that the amount of phosphorous acid added was 0.01 wt % of the positive electrode active material.

<Sample 1-19>

A secondary battery was produced in the same manner as in the production of Sample 1-1, except that the amount of phosphomolybdic acid added was 0.01 wt % of the positive electrode active material, and that the amount of phosphorous acid added was 0.01 wt % of the positive electrode active material.

[Evaluation of Secondary Battery]

(a) High-Temperature Storage Test

The secondary battery of each sample was subjected to constant-current charging at a constant current of 880 mA in an environment of 23° C. until the battery voltage reached 4.2 V, and then to constant-voltage charging at a constant voltage of 4.2 V until the current value reached 1 mA. The secondary batteries in a fully charged state were then stored in an environment of 80° C. for four days. The variation in the thickness of each secondary battery at this time was measured as the amount of swelling under high-temperature storage.

(b) Measurement of Discharge Amount

The secondary batteries of the respective samples were subjected to constant-current charging at a constant current of 880 mA in an environment of 23° C. until the battery voltage reached 4.2 V, and then to constant-voltage charging at a constant voltage of 4.2 V until the current value reached 1 mA. Subsequently, the batteries were discharged at 1 C. The amount of electricity discharged until the battery voltage reached 3.0 V was measured.

The results of evaluation are shown in the following Table 1.

TABLE 1

| | Positive Electrode Active Material | Average Particle Diameter [μm] | Heteropoly Acid | Amount Added [wt %] | Total Amount Added [wt %] | Amount of Swelling [mm] | Discharge Amount [mAh/g] |
|---|---|---|---|---|---|---|---|
| Sample 1-1 | $Li_{1.02}Co_{0.20}Ni_{0.77}Al_{0.03}O_2$ | 14 | Phosphomolybdic acid | 0.05 | 0.1 | 3.84 | 183 |
| | | | Phosphorous acid | 0.05 | | | |
| Sample 1-2 | $Li_{1.02}Co_{0.20}Ni_{0.77}Al_{0.03}O_2$ | 14 | Phosphomolybdic acid | 0.50 | 1.0 | 2.02 | 181 |
| | | | Phosphorous acid | 0.50 | | | |
| Sample 1-3 | $Li_{1.02}Co_{0.20}Ni_{0.77}Al_{0.03}O_2$ | 14 | Phosphomolybdic acid | 0.70 | 1.0 | 1.83 | 181 |
| | | | Phosphorous acid | 0.30 | | | |
| Sample 1-4 | $Li_{1.02}Co_{0.20}Ni_{0.77}Al_{0.03}O_2$ | 14 | Phosphomolybdic acid | 1.00 | 1.0 | 2.41 | 182 |
| | | | Phosphorous acid | — | | | |
| Sample 1-5 | $Li_{1.02}Co_{0.20}Ni_{0.77}Al_{0.03}O_2$ | 14 | Phosphomolybdic acid | — | 1.0 | 5.52 | 182 |
| | | | Phosphorous acid | 1.00 | | | |
| Sample 1-6 | $Li_{1.02}Co_{0.20}Ni_{0.77}Al_{0.03}O_2$ | 14 | Phosphomolybdic acid | 5.5 | 6.0 | 1.18 | 92 |
| | | | Phosphorous acid | 0.50 | | | |
| Sample 1-7 | $Li_{1.02}Co_{0.20}Ni_{0.77}Al_{0.03}O_2$ | 14 | Phosphomolybdic acid | 0.50 | 6.0 | 1.36 | 81 |
| | | | Phosphorous acid | 5.5 | | | |
| Sample 1-8 | $Li_{1.02}Co_{0.98}Mg_{0.01}Al_{0.01}O_2$ | 13 | Phosphomolybdic acid | 0.25 | 0.5 | 2.63 | 154 |
| | | | Phosphorous acid | 0.25 | | | |
| Sample 1-9 | $Li_{1.02}Co_{0.98}Mg_{0.01}Al_{0.01}O_2$ | 13 | Phosphomolybdic acid | 0.30 | 0.5 | 2.44 | 154 |
| | | | Phosphorous acid | 0.20 | | | |
| Sample 1-10 | $Li_{1.02}Co_{0.98}Mg_{0.01}Al_{0.01}O_2$ | 13 | Phosphomolybdic acid | 0.50 | 0.5 | 3.22 | 153 |
| | | | Phosphorous acid | — | | | |
| Sample 1-11 | $Li_{1.02}Co_{0.98}Mg_{0.01}Al_{0.01}O_2$ | 13 | Phosphomolybdic acid | — | 0.5 | 6.82 | 155 |
| | | | Phosphorous acid | 0.50 | | | |
| Sample 1-12 | $Li_{0.98}Co_{0.15}Ni_{0.80}Al_{0.05}O_2$ | 13 | Phosphomolybdic acid | 0.10 | 0.2 | 3.29 | 183 |
| | | | Phosphorous acid | 0.10 | | | |
| Sample 1-13 | $Li_{0.98}Co_{0.15}Ni_{0.80}Al_{0.05}O_2$ | 13 | Phosphomolybdic acid | 0.15 | 0.2 | 2.81 | 183 |
| | | | Phosphorous acid | 0.05 | | | |
| Sample 1-14 | $Li_{0.98}Co_{0.15}Ni_{0.80}Al_{0.05}O_2$ | 13 | Phosphomolybdic acid | 0.20 | 0.2 | 4.27 | 182 |
| | | | Phosphorous acid | — | | | |
| Sample 1-15 | $Li_{0.98}Co_{0.15}Ni_{0.80}Al_{0.05}O_2$ | 13 | Phosphomolybdic acid | — | 0.2 | 8.15 | 183 |
| | | | Phosphorous acid | 0.20 | | | |
| Sample 1-16 | $Li_{1.02}Co_{0.20}Ni_{0.77}Al_{0.03}O_2$ | 14 | Phosphomolybdic acid | 0.05 | 0.15 | 2.81 | 183 |
| | | | Silicotungstic acid | 0.05 | | | |
| | | | Phosphorous acid | 0.05 | | | |
| Sample 1-17 | $Li_{1.02}Co_{0.20}Ni_{0.77}Al_{0.03}O_2$ | 14 | Phosphomolybdic acid | 0.01 | 0.51 | 3.90 | 183 |
| | | | Phosphorous acid | 0.50 | | | |
| Sample 1-18 | $Li_{1.02}Co_{0.20}Ni_{0.77}Al_{0.03}O_2$ | 14 | Phosphomolybdic acid | 0.50 | 0.51 | 3.88 | 183 |
| | | | Phosphorous acid | 0.01 | | | |
| Sample 1-19 | $Li_{1.02}Co_{0.20}Ni_{0.77}Al_{0.03}O_2$ | 14 | Phosphomolybdic acid | 0.01 | 0.02 | 4.10 | 183 |
| | | | Phosphorous acid | 0.01 | | | |

As shown in Table 1, Samples 1-1 to 1-7 use the same positive electrode active material. The results show that battery swelling can be suppressed more in the secondary batteries of Samples 1-1 to 1-3 and 1-17 to 1-19 where the positive electrode contains both phosphomolybdic acid and phosphorous acid than in Sample 1-5 where no phosphomolybdic acid is contained. Also, Samples 1-2 to 1-4 show that when the total amount added is the same (1.0 wt %), the addition of both phosphomolybdic acid and phosphorous acid is more effective in suppressing battery swelling.

As shown by a comparison of Sample 1-1 and Samples 1-2 and 1-3, it was found that the more phosphomolybdic acid and phosphorous acid are added, the more effective it is in suppressing battery swelling. Further, Samples 1-2 and 1-3 show that in the case where the total amount added is the same, the effectiveness in suppressing battery swelling is higher when the proportion of phosphomolybdic acid is larger.

With respect to Samples 1-6 and 1-7 in which the total amount of phosphomolybdic acid and phosphorous acid added is 6.0 wt %, it was found that although battery swelling can be suppressed, as shown by a comparison with Sample 1-2, the discharge amount decreases.

Samples 1-8 to 1-11 use the same positive electrode active material. As shown by Sample 1-11, when no phosphomolybdic acid was added and only phosphorous acid was added, the effectiveness in suppressing battery swelling was low. Further, as shown by Samples 1-8 to 1-10, it was found that when the total amount added is the same (0.5 wt %), the addition of both phosphomolybdic acid and phosphorous acid is more effective in suppressing battery swelling.

Samples 1-12 to 1-15 use the same positive electrode active material. As shown by Sample 1-15, when no phosphomolybdic acid was added and only phosphorous acid was added, the effectiveness in suppressing battery swelling was low as in the cases of Samples 1-5 and 1-11. Further, as shown by Samples 1-12 to 1-14, it was found that when the total amount added is the same (0.20 wt %), the addition of both phosphomolybdic acid and phosphorous acid is more effective in suppressing battery swelling.

Samples 1-1 to 1-7 and Samples 1-12 to 1-19 use composite oxide particles with a high nickel (Ni) content as the positive electrode active material. When composite oxide particles with a high nickel (Ni) content are used as a positive electrode active material, the amount of gas generation tends to increase, leading to an increase in battery swelling. However, as in Samples 1-1 to 1-3, Samples 1-12 and 1-13, and Samples 17-19 by using a heteropoly acid and phosphorous acid in the positive electrode active material layer, battery swelling was sufficiently suppressed.

In addition, as shown by each sample, the addition of phosphomolybdic acid and phosphorous acid achieved a reduction in the amount of battery swelling regardless of the composition of the composite oxide. The samples using composite oxide particles with a high nickel (Ni) content also exhibited a reduced amount of battery swelling, showing that the addition of phosphomolybdic acid is highly effective in suppressing battery swelling.

As shown by Sample 1-16, it was found that the use of several kinds of heteropoly acids is also effective. The combined use of phosphomolybdic acid with another heteropoly acid than silicotungstic acid is also equally effective. Further, the combined use of three or more kinds of heteropoly acids with phosphorous acid is also equally effective. This is because phosphomolybdic acid, phosphotungstic acid, silicomolybdic acid, and silicotungstic acid all have similar functions, and any combination is thus likely to be equally effective.

As shown by Samples 1-17 to 1-19, the addition of the amount of at least 0.01 wt % of phosphomolybdic acid is effective and the addition of the amount of at least 0.01 wt % of phosphorous acid is effective.

Example 2

In the following Example 2, secondary batteries were produced using phosphotungstic acid as a heteropoly acid. The weight of phosphotungstic acid does not include the weight of bound water in the phosphotungstic acid.

<Sample 2-1>
A secondary battery was produced in the same manner as in the production of Sample 1-2, except for using phosphotungstic acid in place of phosphomolybdic acid.

<Sample 2-2>
A secondary battery was produced in the same manner as in the production of Sample 1-3, except for using phosphotungstic acid in place of phosphomolybdic acid.

<Sample 2-3>
A secondary battery was produced in the same manner as in the production of Sample 1-4, except for using phosphotungstic acid in place of phosphomolybdic acid.

<Sample 2-4>
A secondary battery was produced in the same manner as in the production of Sample 1-5, except for using phosphotungstic acid in place of phosphomolybdic acid.

<Sample 2-5>
A secondary battery was produced in the same manner as in the production of Sample 1-8, except for using phosphotungstic acid in place of phosphomolybdic acid.

<Sample 2-6>
A secondary battery was produced in the same manner as in the production of Sample 1-9, except for using phosphotungstic acid in place of phosphomolybdic acid.

<Sample 2-7>
A secondary battery was produced in the same manner as in the production of Sample 1-10, except for using phosphotungstic acid in place of phosphomolybdic acid.

<Sample 2-8>
A secondary battery was produced in the same manner as in the production of Sample 1-11, except for using phosphotungstic acid in place of phosphomolybdic acid.

<Sample 2-9>
A secondary battery was produced in the same manner as in the production of Sample 1-12, except for using phosphotungstic acid in place of phosphomolybdic acid.

<Sample 2-10>
A secondary battery was produced in the same manner as in the production of Sample 1-13, except for using phosphotungstic acid in place of phosphomolybdic acid.

<Sample 2-11>
A secondary battery was produced in the same manner as in the production of Sample 1-14, except for using phosphotungstic acid in place of phosphomolybdic acid.

<Sample 2-12>
A secondary battery was produced in the same manner as in the production of Sample 1-15, except for using phosphotungstic acid in place of phosphomolybdic acid.

<Sample 2-13>
A secondary battery was produced in the same manner as in the production of Sample 1-17, except for using phosphotungstic acid in place of phosphomolybdic acid.

<Sample 2-14>
A secondary battery was produced in the same manner as in the production of Sample 1-18, except for using phosphotungstic acid in place of phosphomolybdic acid.

<Sample 2-15>
A secondary battery was produced in the same manner as in the production of Sample 1-6, except for using phosphotungstic acid in place of phosphomolybdic acid.

<Sample 2-16>
A secondary battery was produced in the same manner as in the production of Sample 1-7, except for using phosphotungstic acid in place of phosphomolybdic acid.

<Sample 2-17>
A secondary battery was produced in the same manner as in the production of Sample 1-19, except for using phosphotungstic acid in place of phosphomolybdic acid.

[Evaluation of Secondary Battery]
(a) High-Temperature Storage Test

In the same manner as in Example 1, the variation in the thickness of each secondary battery was measured as the amount of swelling under high-temperature storage.

The results of evaluation are shown in the following Table 2.

(b) Measurement of Discharge Amount

In the same manner as in Example 1, the discharge amount of each secondary battery was measured.

The results of evaluation are shown in the following Table 2.

TABLE 2

| | Positive Electrode Active Material | Average Particle Diameter [μm] | Heteropoly Acid | Amount Added [wt %] | Total Amount Added [wt %] | Amount of Swelling [mm] | Discharge Amount [mAh/g] |
|---|---|---|---|---|---|---|---|
| Sample 2-1 | $Li_{1.02}Co_{0.20}Ni_{0.77}Al_{0.03}O_2$ | 14 | Phosphotungstic acid<br>Phosphorous acid | 0.50<br>0.50 | 1.0 | 2.02 | 182 |
| Sample 2-2 | $Li_{1.02}Co_{0.20}Ni_{0.77}Al_{0.03}O_2$ | 14 | Phosphotungstic acid<br>Phosphorous acid | 0.70<br>0.30 | 1.0 | 1.91 | 182 |
| Sample 2-3 | $Li_{1.02}Co_{0.20}Ni_{0.77}Al_{0.03}O_2$ | 14 | Phosphotungstic acid<br>Phosphorous acid | 1.00<br>— | 1.0 | 2.41 | 182 |
| Sample 2-4 | $Li_{1.02}Co_{0.20}Ni_{0.77}Al_{0.03}O_2$ | 14 | Phosphotungstic acid<br>Phosphorous acid | —<br>1.00 | 1.0 | 5.52 | 182 |

TABLE 2-continued

|  | Positive Electrode Active Material | Average Particle Diameter [μm] | Heteropoly Acid | Amount Added [wt %] | Total Amount Added [wt %] | Amount of Swelling [mm] | Discharge Amount [mAh/g] |
|---|---|---|---|---|---|---|---|
| Sample 2-5 | $Li_{1.02}Co_{0.98}Mg_{0.01}Al_{0.01}O_2$ | 13 | Phosphotungstic acid | 0.25 | 0.5 | 2.63 | 153 |
|  |  |  | Phosphorous acid | 0.25 |  |  |  |
| Sample 2-6 | $Li_{1.02}Co_{0.98}Mg_{0.01}Al_{0.01}O_2$ | 13 | Phosphotungstic acid | 0.30 | 0.5 | 2.44 | 153 |
|  |  |  | Phosphorous acid | 0.20 |  |  |  |
| Sample 2-7 | $Li_{1.02}Co_{0.98}Mg_{0.01}Al_{0.01}O_2$ | 13 | Phosphotungstic acid | 0.50 | 0.5 | 3.22 | 153 |
|  |  |  | Phosphorous acid | — |  |  |  |
| Sample 2-8 | $Li_{1.02}Co_{0.98}Mg_{0.01}Al_{0.01}O_2$ | 13 | Phosphotungstic acid | — | 0.5 | 6.82 | 153 |
|  |  |  | Phosphorous acid | 0.50 |  |  |  |
| Sample 2-9 | $Li_{0.98}Co_{0.15}Ni_{0.80}Al_{0.05}O_2$ | 13 | Phosphotungstic acid | 0.10 | 0.2 | 3.29 | 183 |
|  |  |  | Phosphorous acid | 0.10 |  |  |  |
| Sample 2-10 | $Li_{0.98}Co_{0.15}Ni_{0.80}Al_{0.05}O_2$ | 13 | Phosphotungstic acid | 0.15 | 0.2 | 2.81 | 182 |
|  |  |  | Phosphorous acid | 0.05 |  |  |  |
| Sample 2-11 | $Li_{0.98}Co_{0.15}Ni_{0.80}Al_{0.05}O_2$ | 13 | Phosphotungstic acid | 0.20 | 0.2 | 4.27 | 182 |
|  |  |  | Phosphorous acid | — |  |  |  |
| Sample 2-12 | $Li_{0.98}Co_{0.15}Ni_{0.80}Al_{0.05}O_2$ | 13 | Phosphotungstic acid | — | 0.2 | 8.15 | 183 |
|  |  |  | Phosphorous acid | 0.20 |  |  |  |
| Sample 2-13 | $Li_{1.02}Co_{0.20}Ni_{0.77}Al_{0.03}O_2$ | 14 | Phosphotungstic acid | 0.01 | 0.51 | 3.90 | 182 |
|  |  |  | Phosphorous acid | 0.50 |  |  |  |
| Sample 2-14 | $Li_{1.02}Co_{0.20}Ni_{0.77}Al_{0.03}O_2$ | 14 | Phosphotungstic acid | 0.50 | 1.50 | 3.88 | 181 |
|  |  |  | Phosphorous acid | 1.00 |  |  |  |
| Sample 2-15 | $Li_{1.02}Co_{0.20}Ni_{0.77}Al_{0.03}O_2$ | 14 | Phosphotungstic acid | 5.50- | 6.00 | 0.83 | 99 |
|  |  |  | Phosphorous acid | 0.50 |  |  |  |
| Sample 2-16 | $Li_{1.02}Co_{0.20}Ni_{0.77}Al_{0.03}O_2$ | 14 | Phosphotungstic acid | 0.50 | 6.00 | 1.24 | 102 |
|  |  |  | Phosphorous acid | 5.50 |  |  |  |
| Sample 2-17 | $Li_{1.02}Co_{0.20}Ni_{0.77}Al_{0.03}O_2$ | 14 | Phosphotungstic acid | 0.01 | 0.02 | 4.09 | 182 |
|  |  |  | Phosphorous acid | 0.01 |  |  |  |

As shown in Table 2, it was found that the use of phosphotungstic acid as a heteropoly acid added to the positive electrode is also effective in suppressing battery swelling like in Example 1. It was also found that the more the total amount of phosphotungstic acid and phosphorous acid added is, the more effective it is in suppressing battery swelling. It was also found that the addition of the amount of at least 0.01 wt % of phosphotungstic acid is effective and the addition of the amount of at least 0.01 wt % of phosphorous acid is effective.

Example 3

In the following Example 3, secondary batteries were produced using silicomolybdic acid as a heteropoly acid. The weight of silicomolybdic acid does not include the weight of bound water in the silicomolybdic acid.

<Sample 3-1>
A secondary battery was produced in the same manner as in the production of Sample 1-2, except for using silicomolybdic acid in place of phosphomolybdic acid.

<Sample 3-2>
A secondary battery was produced in the same manner as in the production of Sample 1-3, except for using silicomolybdic acid in place of phosphomolybdic acid.

<Sample 3-3>
A secondary battery was produced in the same manner as in the production of Sample 1-4, except for using silicomolybdic acid in place of phosphomolybdic acid.

<Sample 3-4>
A secondary battery was produced in the same manner as in the production of Sample 1-5, except for using silicomolybdic acid in place of phosphomolybdic acid.

<Sample 3-5>
A secondary battery was produced in the same manner as in the production of Sample 1-8, except for using silicomolybdic acid in place of phosphomolybdic acid.

<Sample 3-6>
A secondary battery was produced in the same manner as in the production of Sample 1-9, except for using silicomolybdic acid in place of phosphomolybdic acid.

<Sample 3-7>
A secondary battery was produced in the same manner as in the production of Sample 1-10, except for using silicomolybdic acid in place of phosphomolybdic acid.

<Sample 3-8>
A secondary battery was produced in the same manner as in the production of Sample 1-11, except for using silicomolybdic acid in place of phosphomolybdic acid.

<Sample 3-9>
A secondary battery was produced in the same manner as in the production of Sample 1-12, except for using silicomolybdic acid in place of phosphomolybdic acid.

<Sample 3-10>
A secondary battery was produced in the same manner as in the production of Sample 1-13, except for using silicomolybdic acid in place of phosphomolybdic acid.

<Sample 3-11>
A secondary battery was produced in the same manner as in the production of Sample 1-14, except for using silicomolybdic acid in place of phosphomolybdic acid.

<Sample 3-12>
A secondary battery was produced in the same manner as in the production of Sample 1-15, except for using silicomolybdic acid in place of phosphomolybdic acid.

<Sample 3-13>
A secondary battery was produced in the same manner as in the production of Sample 1-17, except for using silicomolybdic acid in place of phosphomolybdic acid.

<Sample 3-14>
A secondary battery was produced in the same manner as in the production of Sample 1-18, except for using silicomolybdic acid in place of phosphomolybdic acid.

<Sample 3-15>
A secondary battery was produced in the same manner as in the production of Sample 1-6, except for using silicomolybdic acid in place of phosphomolybdic acid.

<Sample 3-16>

A secondary battery was produced in the same manner as in the production of Sample 1-7, except for using silicomolybdic acid in place of phosphomolybdic acid.

<Sample 3-17>

A secondary battery was produced in the same manner as in the production of Sample 1-19, except for using silicomolybdic acid in place of phosphomolybdic acid.

[Evaluation of Secondary Battery]

(a) High-Temperature Storage Test

In the same manner as in Example 1, the variation in the thickness of each secondary battery was measured as the amount of swelling under high-temperature storage.

The results of evaluation are shown in the following Table 3.

(b) Measurement of Discharge Amount

In the same manner as in Example 1, the discharge amount of each secondary battery was measured.

The results of evaluation are shown in the following Table 3.

Example 4

In the following Example 4, secondary batteries were produced using silicotungstic acid as a heteropoly acid. The weight of silicotungstic acid does not include the weight of bound water in the silicotungstic acid.

<Sample 4-1>

A secondary battery was produced in the same manner as in the production of Sample 1-2, except for using silicotungstic acid in place of phosphomolybdic acid.

<Sample 4-2>

A secondary battery was produced in the same manner as in the production of Sample 1-3, except for using silicotungstic acid in place of phosphomolybdic acid.

<Sample 4-3>

A secondary battery was produced in the same manner as in the production of Sample 1-4, except for using silicotungstic acid in place of phosphomolybdic acid.

TABLE 3

| | Positive Electrode Active Material | Average Particle Diameter [μm] | Heteropoly Acid | Amount Added [wt %] | Total Amount Added [w %] | Amount of Swelling [mm] | Discharge Amount [mAh/g] |
|---|---|---|---|---|---|---|---|
| Sample 3-1 | $Li_{1.02}Co_{0.20}Ni_{0.77}Al_{0.03}O_2$ | 14 | Silicomolybdic acid | 0.50 | 1.0 | 2.21 | 183 |
| | | | Phosphorous acid | 0.50 | | | |
| Sample 3-2 | $Li_{1.02}Co_{0.20}Ni_{0.77}Al_{0.03}O_2$ | 14 | Silicomolybdic acid | 0.70 | 1.0 | 1.90 | 183 |
| | | | Phosphorous acid | 0.30 | | | |
| Sample 3-3 | $Li_{1.02}Co_{0.20}Ni_{0.77}Al_{0.03}O_2$ | 14 | Silicomolybdic acid | 1.00 | 1.0 | 2.95 | 183 |
| | | | Phosphorous acid | — | | | |
| Sample 3-4 | $Li_{1.02}Co_{0.20}Ni_{0.77}Al_{0.03}O_2$ | 14 | Silicomolybdic acid | — | 1.0 | 5.52 | 182 |
| | | | Phosphorous acid | 1.00 | | | |
| Sample 3-5 | $Li_{1.02}Co_{0.98}Mg_{0.01}Al_{0.01}O_2$ | 13 | Silicomolybdic acid | 0.25 | 0.5 | 2.84 | 154 |
| | | | Phosphorous acid | 0.25 | | | |
| Sample 3-6 | $Li_{1.02}Co_{0.98}Mg_{0.01}Al_{0.01}O_2$ | 13 | Silicomolybdic acid | 0.30 | 0.5 | 2.56 | 154 |
| | | | Phosphorous acid | 0.20 | | | |
| Sample 3-7 | $Li_{1.02}Co_{0.98}Mg_{0.01}Al_{0.01}O_2$ | 13 | Silicomolybdic acid | 0.50 | 0.5 | 3.57 | 154 |
| | | | Phosphorous acid | — | | | |
| Sample 3-8 | $Li_{1.02}Co_{0.98}Mg_{0.01}Al_{0.01}O_2$ | 13 | Silicomolybdic acid | — | 0.5 | 6.82 | 153 |
| | | | Phosphorous acid | 0.50 | | | |
| Sample 3-9 | $Li_{0.98}Co_{0.15}Ni_{0.80}Al_{0.05}O_2$ | 13 | Silicomolybdic acid | 0.10 | 0.2 | 3.71 | 183 |
| | | | Phosphorous acid | 0.10 | | | |
| Sample 3-10 | $Li_{0.98}Co_{0.15}Ni_{0.80}Al_{0.05}O_2$ | 13 | Silicomolybdic acid | 0.15 | 0.2 | 2.94 | 183 |
| | | | Phosphorous acid | 0.05 | | | |
| Sample 3-11 | $Li_{0.98}Co_{0.15}Ni_{0.80}Al_{0.05}O_2$ | 13 | Silicomolybdic acid | 0.20 | 0.2 | 4.81 | 183 |
| | | | Phosphorous acid | — | | | |
| Sample 3-12 | $Li_{0.98}Co_{0.15}Ni_{0.80}Al_{0.05}O_2$ | 13 | Silicomolybdic acid | — | 0.2 | 8.15 | 182 |
| | | | Phosphorous acid | 0.20 | | | |
| Sample 3-13 | $Li_{1.02}Co_{0.20}Ni_{0.77}Al_{0.03}O_2$ | 14 | Silicomolybdic acid | 0.01 | 0.51 | 2.88 | 183 |
| | | | Phosphorous acid | 0.50 | | | |
| Sample 3-14 | $Li_{1.02}Co_{0.20}Ni_{0.77}Al_{0.03}O_2$ | 14 | Silicomolybdic acid | 0.50 | 1.50 | 2.12 | 183 |
| | | | Phosphorous acid | 1.00 | | | |
| Sample 3-15 | $Li_{1.02}Co_{0.20}Ni_{0.77}Al_{0.03}O_2$ | 14 | Silicomolybdic acid | 5.50- | 6.00 | 0.77 | 132 |
| | | | Phosphorous acid | 0.50 | | | |
| Sample 3-16 | $Li_{1.02}Co_{0.20}Ni_{0.77}Al_{0.03}O_2$ | 14 | Silicomolybdic acid | 0.50 | 6.00 | 1.11 | 112 |
| | | | Phosphorous acid | 5.50 | | | |
| Sample 3-17 | $Li_{1.02}Co_{0.20}Ni_{0.77}Al_{0.03}O_2$ | 14 | Silicomolybdic acid | 0.01 | 0.02 | 2.98 | 183 |
| | | | Phosphorous acid | 0.01 | | | |

As shown in Table 3, it was found that the use of silicomolybdic acid as a heteropoly acid added to the positive electrode is also effective in suppressing battery swelling like in Example 1. It was also found that the more the total amount of silicomolybdic acid and phosphorous acid added is, the more effective it is in suppressing battery swelling. It was also found that the addition of the amount of at least 0.01 wt % of silicomolybdic acid is effective and the addition of the amount of at least 0.01 wt % of phosphorous acid is effective.

<Sample 4-4>

A secondary battery was produced in the same manner as in the production of Sample 1-5, except for using silicotungstic acid in place of phosphomolybdic acid.

<Sample 4-5>

A secondary battery was produced in the same manner as in the production of Sample 1-8, except for using silicotungstic acid in place of phosphomolybdic acid.

<Sample 4-6>
A secondary battery was produced in the same manner as in the production of Sample 1-9, except for using silicotungstic acid in place of phosphomolybdic acid.
<Sample 4-7>
A secondary battery was produced in the same manner as in the production of Sample 1-10, except for using silicotungstic acid in place of phosphomolybdic acid.
<Sample 4-8>
A secondary battery was produced in the same manner as in the production of Sample 1-11, except for using silicotungstic acid in place of phosphomolybdic acid.
<Sample 4-9>
A secondary battery was produced in the same manner as in the production of Sample 1-12, except for using silicotungstic acid in place of phosphomolybdic acid.
<Sample 4-10>
A secondary battery was produced in the same manner as in the production of Sample 1-13, except for using silicotungstic acid in place of phosphomolybdic acid.
<Sample 4-11>
A secondary battery was produced in the same manner as in the production of Sample 1-14, except for using silicotungstic acid in place of phosphomolybdic acid.
<Sample 4-12>
A secondary battery was produced in the same manner as in the production of Sample 1-15, except for using silicotungstic acid in place of phosphomolybdic acid.
<Sample 4-13>
A secondary battery was produced in the same manner as in the production of Sample 1-17, except for using silicotungstic acid in place of phosphomolybdic acid.
<Sample 4-14>
A secondary battery was produced in the same manner as in the production of Sample 1-18, except for using silicotungstic acid in place of phosphomolybdic acid.
<Sample 4-15>
A secondary battery was produced in the same manner as in the production of Sample 1-6, except for using silicotungstic acid in place of phosphomolybdic acid.
<Sample 4-16>
A secondary battery was produced in the same manner as in the production of Sample 1-7, except for using silicotungstic acid in place of phosphomolybdic acid.
<Sample 4-17>
A secondary battery was produced in the same manner as in the production of Sample 1-19, except for using silicotungstic acid in place of phosphomolybdic acid.

[Evaluation of Secondary Battery]
(a) High-Temperature Storage Test
In the same manner as in Example 1, the variation in the thickness of each secondary battery was measured as the amount of swelling under high-temperature storage.
The results of evaluation are shown in the following Table 4.
(b) Measurement of Discharge Amount
In the same manner as in Example 1, the discharge amount of each secondary battery was measured.
The results of evaluation are shown in the following Table 4.

TABLE 4

| | Positive Electrode Active Material | Average Particle Diameter [μm] | Heteropoly Acid | Amount Added [wt %] | Total Amount Added [wt %] | Amount of Swelling [mm] | Discharge Amount [mAh/g] |
|---|---|---|---|---|---|---|---|
| Sample 4-1 | $Li_{1.02}Co_{0.20}Ni_{0.77}Al_{0.03}O_2$ | 14 | Silicotungstic acid<br>Phosphorous acid | 0.50<br>0.50 | 1.0 | 2.25 | 182 |
| Sample 4-2 | $Li_{1.02}Co_{0.20}Ni_{0.77}Al_{0.03}O_2$ | 14 | Silicotungstic acid<br>Phosphorous acid | 0.70<br>0.30 | 1.0 | 1.89 | 181 |
| Sample 4-3 | $Li_{1.02}Co_{0.20}Ni_{0.77}Al_{0.03}O_2$ | 14 | Silicotungstic acid<br>Phosphorous acid | 1.00<br>— | 1.0 | 2.88 | 181 |
| Sample 4-4 | $Li_{1.02}Co_{0.20}Ni_{0.77}Al_{0.03}O_2$ | 14 | Silicotungstic acid<br>Phosphorous acid | —<br>1.00 | 1.0 | 5.52 | 182 |
| Sample 4-5 | $Li_{1.02}Co_{0.98}Mg_{0.01}Al_{0.01}O_2$ | 13 | Silicotungstic acid<br>Phosphorous acid | 0.25<br>0.25 | 0.5 | 2.96 | 154 |
| Sample 4-6 | $Li_{1.02}Co_{0.98}Mg_{0.01}Al_{0.01}O_2$ | 13 | Silicotungstic acid<br>Phosphorous acid | 0.30<br>0.20 | 0.5 | 2.76 | 154 |
| Sample 4-7 | $Li_{1.02}Co_{0.98}Mg_{0.01}Al_{0.01}O_2$ | 13 | Silicotungstic acid<br>Phosphorous acid | 0.50<br>— | 0.5 | 3.68 | 153 |
| Sample 4-8 | $Li_{1.02}Co_{0.98}Mg_{0.01}Al_{0.01}O_2$ | 13 | Silicotungstic acid<br>Phosphorous acid | —<br>0.50 | 0.5 | 6.82 | 154 |
| Sample 4-9 | $Li_{0.98}Co_{0.15}Ni_{0.80}Al_{0.05}O_2$ | 13 | Silicotungstic acid<br>Phosphorous acid | 0.10<br>0.10 | 0.2 | 3.79 | 183 |
| Sample 4-10 | $Li_{0.98}Co_{0.15}Ni_{0.80}Al_{0.05}O_2$ | 13 | Silicotungstic acid<br>Phosphorous acid | 0.15<br>0.05 | 0.2 | 3.07 | 183 |
| Sample 4-11 | $Li_{0.98}Co_{0.15}Ni_{0.80}Al_{0.05}O_2$ | 13 | Silicotungstic acid<br>Phosphorous acid | 0.20<br>— | 0.2 | 4.86 | 183 |
| Sample 4-12 | $Li_{0.98}Co_{0.15}Ni_{0.80}Al_{0.05}O_2$ | 13 | Silicotungstic acid<br>Phosphorous acid | —<br>0.20 | 0.2 | 8.15 | 184 |
| Sample 4-13 | $Li_{1.02}Co_{0.20}Ni_{0.77}Al_{0.03}O_2$ | 14 | Silicotungstic acid<br>Phosphorous acid | 0.01<br>0.50 | 0.51 | 3.19 | 182 |
| Sample 4-14 | $Li_{1.02}Co_{0.20}Ni_{0.77}Al_{0.03}O_2$ | 14 | Silicotungstic acid<br>Phosphorous acid | 0.50<br>1.00 | 1.50 | 2.93 | 182 |
| Sample 4-15 | $Li_{1.02}Co_{0.20}Ni_{0.77}Al_{0.03}O_2$ | 14 | Silicotungstic acid<br>Phosphorous acid | 5.50-<br>0.50 | 6.00 | 0.68 | 94 |
| Sample 4-16 | $Li_{1.02}Co_{0.20}Ni_{0.77}Al_{0.03}O_2$ | 14 | Silicotungstic acid<br>Phosphorous acid | 0.50<br>5.50 | 6.00 | 1.15 | 89 |
| Sample 4-17 | $Li_{1.02}Co_{0.20}Ni_{0.77}Al_{0.03}O_2$ | 14 | Silicotungstic acid<br>Phosphorous acid | 0.01<br>0.01 | 0.02 | 3.29 | 182 |

As shown in Table 4, it was found that the use of silicotungstic acid as a heteropoly acid added to the positive electrode is also effective in suppressing battery swelling like in Example 1. It was also found that the more the total amount of silicotungstic acid and phosphorous acid added is, the more effective it is in suppressing battery swelling. It was also found that the addition of the amount of at least 0.01 wt % of silicotungstic acid is effective and the addition of the amount of at least 0.01 wt % of phosphorous acid is effective.

As described above, in a secondary battery using a positive electrode that contains a heteropoly acid (or a heteropoly acid compound), battery swelling can be suppressed. Such effects can be obtained regardless of the configuration of the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A positive electrode for a nonaqueous electrolyte battery, the positive electrode comprising:
a collector; and
a positive electrode active material layer,
the positive electrode active material layer including: (a) a positive electrode active material; (b) a heteropoly acid and/or heteropoly acid compound; and (c) phosphorous acid, wherein the heteropoly acid is a condensate of two or more kinds of oxo acids,
wherein the heteropoly acid and/or heteropoly acid compound is one having a polyatom selected from the following Element Group (a), with the polyatom being partially substituted with at least one element selected from the following Element Group (b)
Element Group (a): Mo, W, Nb, and V,
Element Group (b): Ti, Cr, Ni, Cu, Zn, Ga, Zr, Tc, Rh, Cd, In, Sn, Ta, Re, Tl, and Pb.

2. A positive electrode according to claim 1, wherein the heteropoly acid and/or heteropoly acid compound includes at least one kind selected from the group consisting of phosphomolybdic acid, phosphotungstic acid, silicomolybdic acid, silicotungstic acid, and compounds thereof.

3. A positive electrode according to claim 2, wherein the amount of the heteropoly acid and/or heteropoly acid compound added and the amount of the phosphorous acid added are each 0.01 wt % or more and 5.0 wt % or less based on 100 wt % of the positive electrode active material.

4. A positive electrode according to claim 3, wherein the positive electrode active material has an average composition represented by Chemical Formula (1) or Chemical Formula (2)

$$Li_aCo_bNi_cM_{1-b-c}O_d \qquad (1)$$

wherein
M is at least one element selected from the group consisting of boron, magnesium, aluminum, silicon, phosphorus, sulfur, titanium, chromium, manganese, iron, copper, zinc, gallium, germanium, yttrium, zirconium, molybdenum, silver, barium, tungsten, indium, tin, lead, and antimony, and
a, b, c, and d are values within ranges of $0.2 \le a \le 1.4$, $0 \le b \le 1.0$, $0 \le c \le 1.0$, and $1.8 \le d \le 2.2$, respectively, provided that the composition of lithium varies depending on the state of charge or discharge, and x represents a value in a fully discharged state; or $$Li_hMn_{2-i}M2_iO_j \qquad (2)$$

wherein
M2 represents at least one element selected from the group consisting of cobalt, nickel, magnesium, aluminum, boron, titanium, vanadium, chromium, iron, copper, zinc, molybdenum, tin, calcium, strontium, and tungsten, and
h, i, and j are values within ranges of $0.9 \le h \le 1.1$, $0 \le i \le 0.6$, and $3.7 \le j \le 4.1$, respectively, provided that the composition of lithium varies depending on the state of charge or discharge, and h represents a value in a fully discharged state.

5. A nonaqueous electrolyte battery comprising:
a positive electrode including a collector and a positive electrode active material layer, the positive electrode active material layer including: (a) a positive electrode active material; (b) a heteropoly acid and/or heteropoly acid compound, wherein the heteropoly acid is a condensate of two or more kinds of oxo acids; and (c) and phosphorous acid;
a negative electrode; and
a nonaqueous electrolyte,
wherein the heteropoly acid and/or heteropoly acid compound is one having a polyatom selected from the following Element Group (a), with the polyatom being partially substituted with at least one element selected from the following Element Group (b)
Element Group (a): Mo, W, Nb, and V,
Element Group (b): Ti, Cr, Ni, Cu, Zn, Ga, Zr, Tc, Rh, Cd, In, Sn, Ta, Re, Tl, and Pb.

6. A nonaqueous electrolyte battery according to claim 5, wherein the heteropoly acid and/or heteropoly acid compound is at least one kind selected from the group consisting of phosphomolybdic acid, phosphotungstic acid, silicomolybdic acid, silicotungstic acid, and compounds thereof.

7. A nonaqueous electrolyte battery according to claim 6, wherein the amount of the heteropoly acid and/or heteropoly acid compound added and the amount of the phosphorous acid added are each 0.01 wt % or more and 5.0 wt % or less based on 100 wt % of the positive electrode active material.

8. A nonaqueous electrolyte battery according to claim 7, wherein the positive electrode active material has an average composition represented by Chemical Formula (1) or Chemical Formula (2)

$$Li_aCo_bNi_cM1_{1-b-c}O_d \qquad (1)$$

wherein
M1 is at least one element selected from the group consisting of boron, magnesium, aluminum, silicon, phosphorus, sulfur, titanium, chromium, manganese, iron, copper, zinc, gallium, germanium, yttrium, zirconium, molybdenum, silver, barium, tungsten, indium, tin, lead, and antimony, and
a, b, c, and, d are values within ranges of $0.2 \le a \le 1.4$, $0 \le b \le 1.0$, $0 \le c \le 1.0$, and $1.8 \le d \le 2.2$, respectively, provided that the composition of lithium varies depending on the state of charge or discharge, and a represents a value in a fully discharged state; or $$Li_hMn_{2-i}M2_iO_j \qquad (2)$$

wherein
M2 is at least one element selected from the group consisting of cobalt, nickel, magnesium, aluminum, boron, titanium, vanadium, chromium, iron, copper, zinc, molybdenum, tin, calcium, strontium, and tungsten, and h, i, and j are values within ranges of $0.9 \leq h \leq 1.1$, $0 \leq i \leq 0.6$, and $3.7 \leq j \leq 4.1$, respectively, provided that the composition of lithium varies depending on the state of charge or discharge, and h represents a value in a fully discharged state.

9. A nonaqueous electrolyte battery according to claim 5, having a flat shape housed in a laminate film or a prismatic shape housed in a prismatic outer packaging case.

* * * * *